Figure 1:
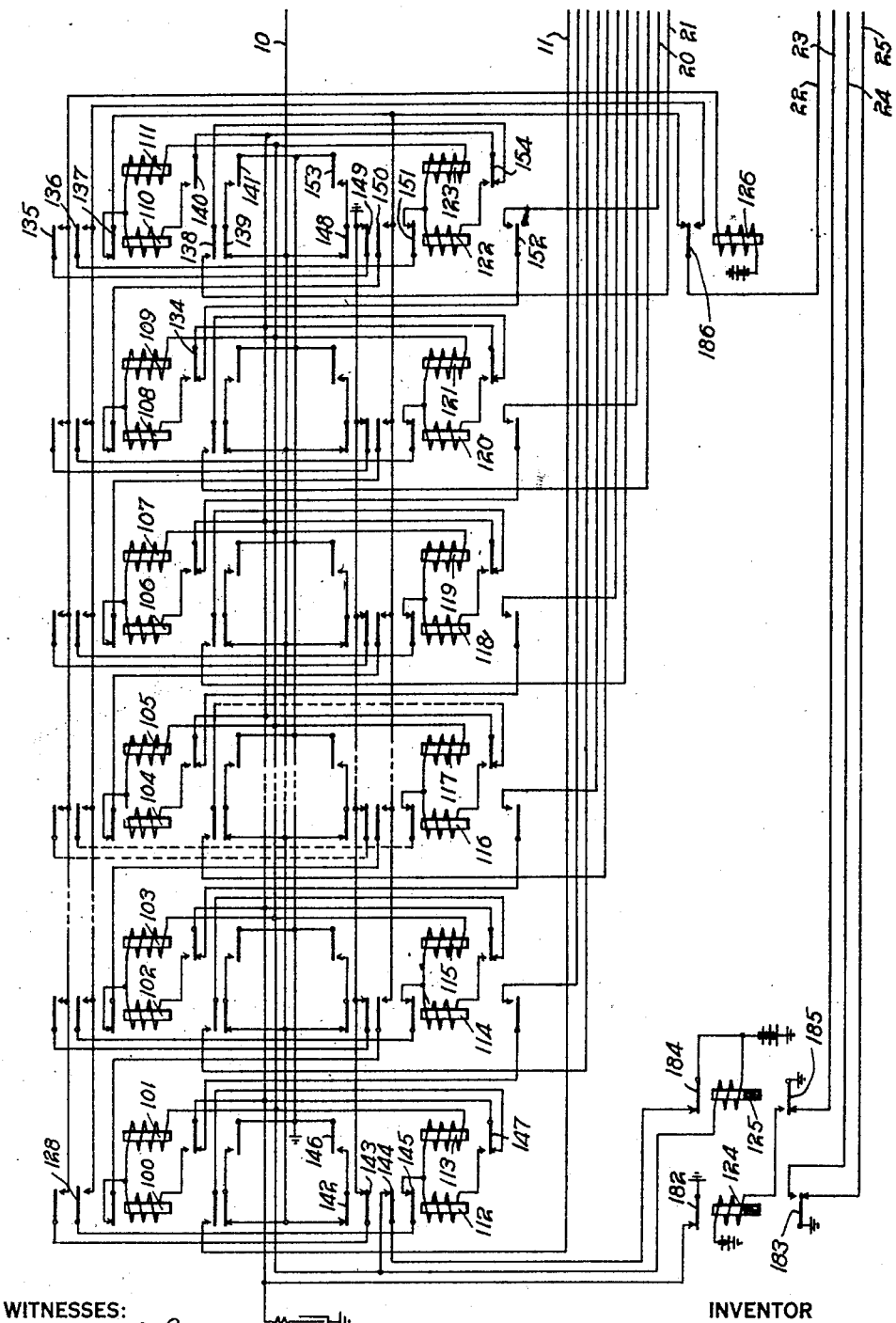

March 3, 1931.  T. U. WHITE  1,795,000
SUPERVISORY AND CONTROL SYSTEM
Filed March 26, 1925  14 Sheets-Sheet 1

WITNESSES:
INVENTOR
Thomas U. White
BY
ATTORNEY

March 3, 1931. T. U. WHITE 1,795,000
SUPERVISORY AND CONTROL SYSTEM
Filed March 26, 1925 14 Sheets-Sheet 3

WITNESSES:

INVENTOR
Thomas U. White
BY
ATTORNEY

March 3, 1931.   T. U. WHITE   1,795,000
SUPERVISORY AND CONTROL SYSTEM
Filed March 26, 1925   14 Sheets-Sheet 4

WITNESSES:
H. B. Funk
J. E. Gardner

INVENTOR
Thomas U. White
BY
Chesley G. Carr
ATTORNEY

March 3, 1931.  T. U. WHITE  1,795,000
SUPERVISORY AND CONTROL SYSTEM
Filed March 26, 1925  14 Sheets-Sheet 9

WITNESSES:

INVENTOR
Thomas U. White
BY
ATTORNEY

March 3, 1931.  T. U. WHITE  1,795,000
SUPERVISORY AND CONTROL SYSTEM
Filed March 26, 1925    14 Sheets-Sheet 11

WITNESSES:

INVENTOR
Thomas U. White
BY
ATTORNEY

March 3, 1931. T. U. WHITE 1,795,000
SUPERVISORY AND CONTROL SYSTEM
Filed March 26, 1925 14 Sheets-Sheet 13

WITNESSES:
INVENTOR
Thomas U. White
BY
ATTORNEY

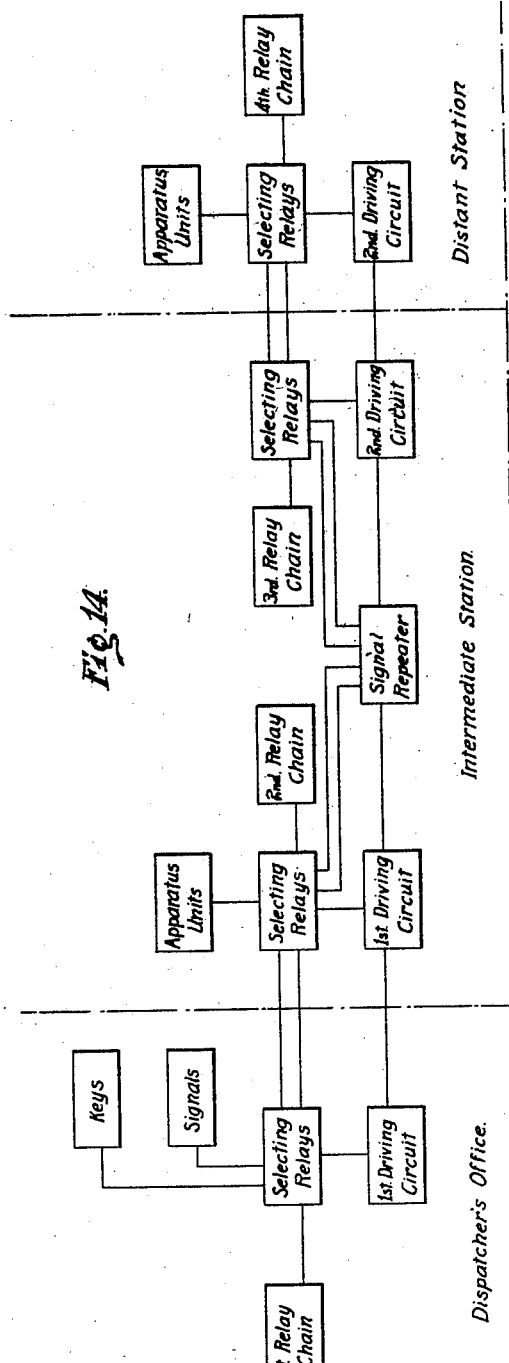

Patented Mar. 3, 1931

1,795,000

UNITED STATES PATENT OFFICE

THOMAS U. WHITE, OF PITTSBURGH, PENNSYLVANIA, ASSIGNOR TO WESTINGHOUSE ELECTRIC & MANUFACTURING COMPANY, A CORPORATION OF PENNSYLVANIA

SUPERVISORY AND CONTROL SYSTEM

Application filed March 26, 1925. Serial No. 18,412.

My invention relates to signalling and control systems and particularly to systems for supervising and controlling, from a central point, remotely-disposed apparatus.

One object of my invention is to provide improved selecting means under the control of a dispatcher at a central station for enabling him to select, at relatively high speed, apparatus units located at different remotely-disposed points.

Another object of my invention is to provide selecting apparatus for selecting, under the control of a dispatcher, apparatus units of several stations or substations in a predetermined manner.

Another object of my invention is to provide selecting apparatus, of the above indicated character, that shall consist solely of relays.

Another object of my invention is to provide circuits whereby the principle of synchronous-relay selection, as shown in my copending application Serial No. 699,670, filed March 17, 1924, Patent No. 1,714,969, dated May 25, 1929, may be applied to a system for supervising and controlling several substations from a central point or dispatcher's office.

Another object of my invention is to provide means for repeating the signals sent from the dispatcher's office through an intermediate station to the desired station to control an operation thereat.

A still further object of my invention is to provide means for signalling from a distant station through an intermediate station to the dispatcher's office.

There are other objects of my invention which, together with the foregoing, will be described in the detailed specification which is to follow.

Referring now to the drawings, comprising Figures 1 to 15, inclusive, I have shown, by means of the usual conventional diagrams, sufficient apparatus to enable my invention to be readily explained and understood.

Figure 2:
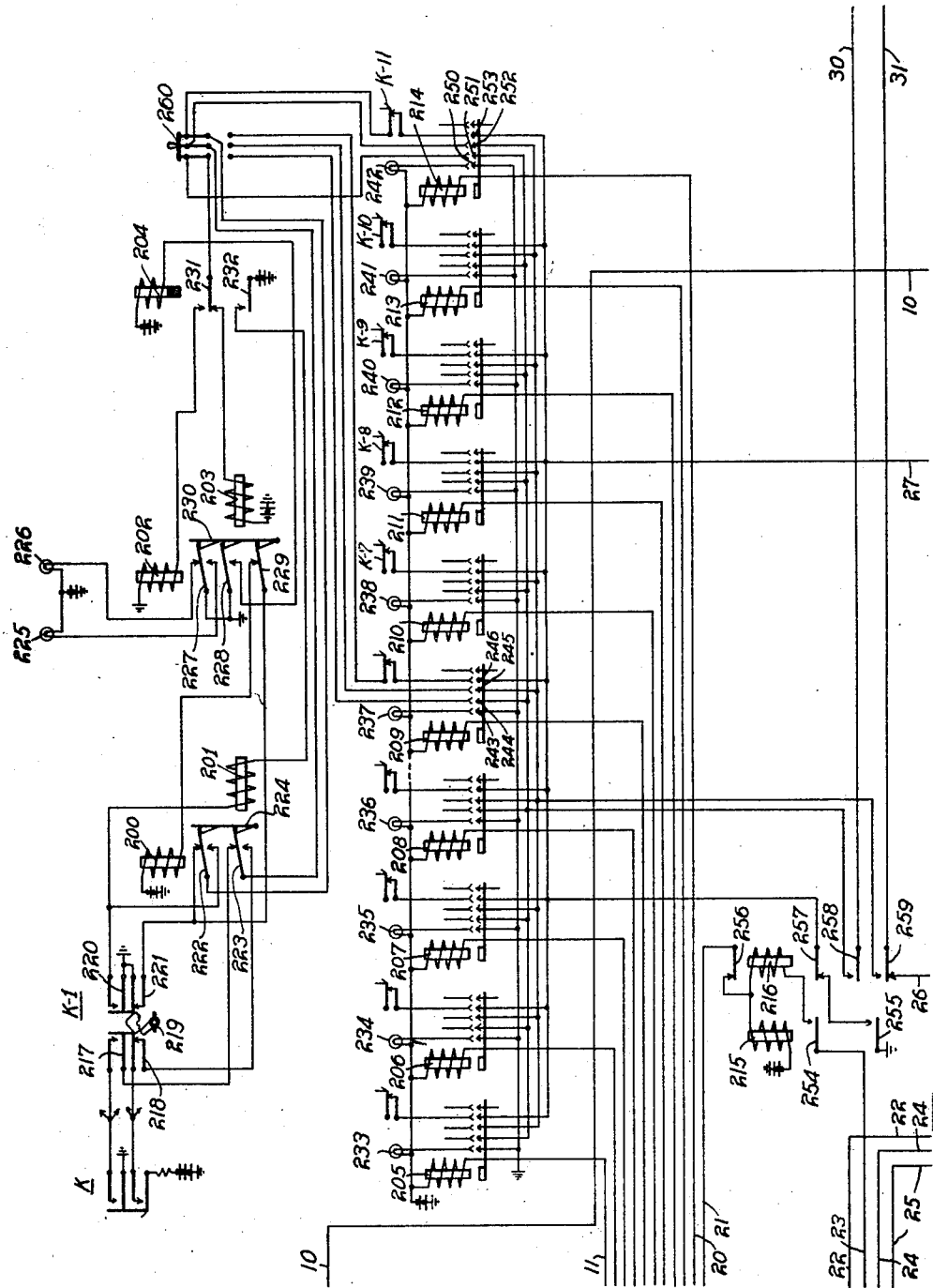
Figure 3:
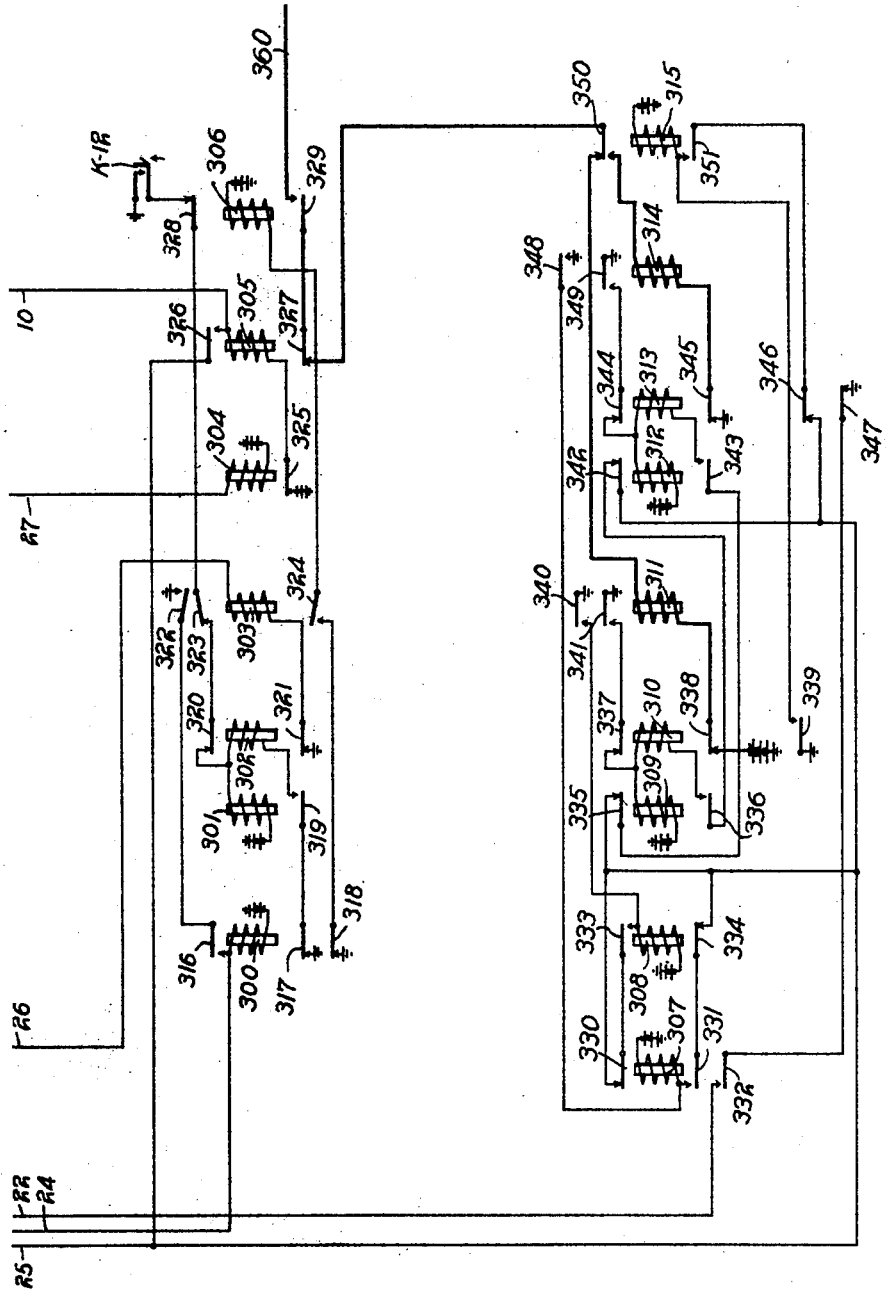
Figure 9:
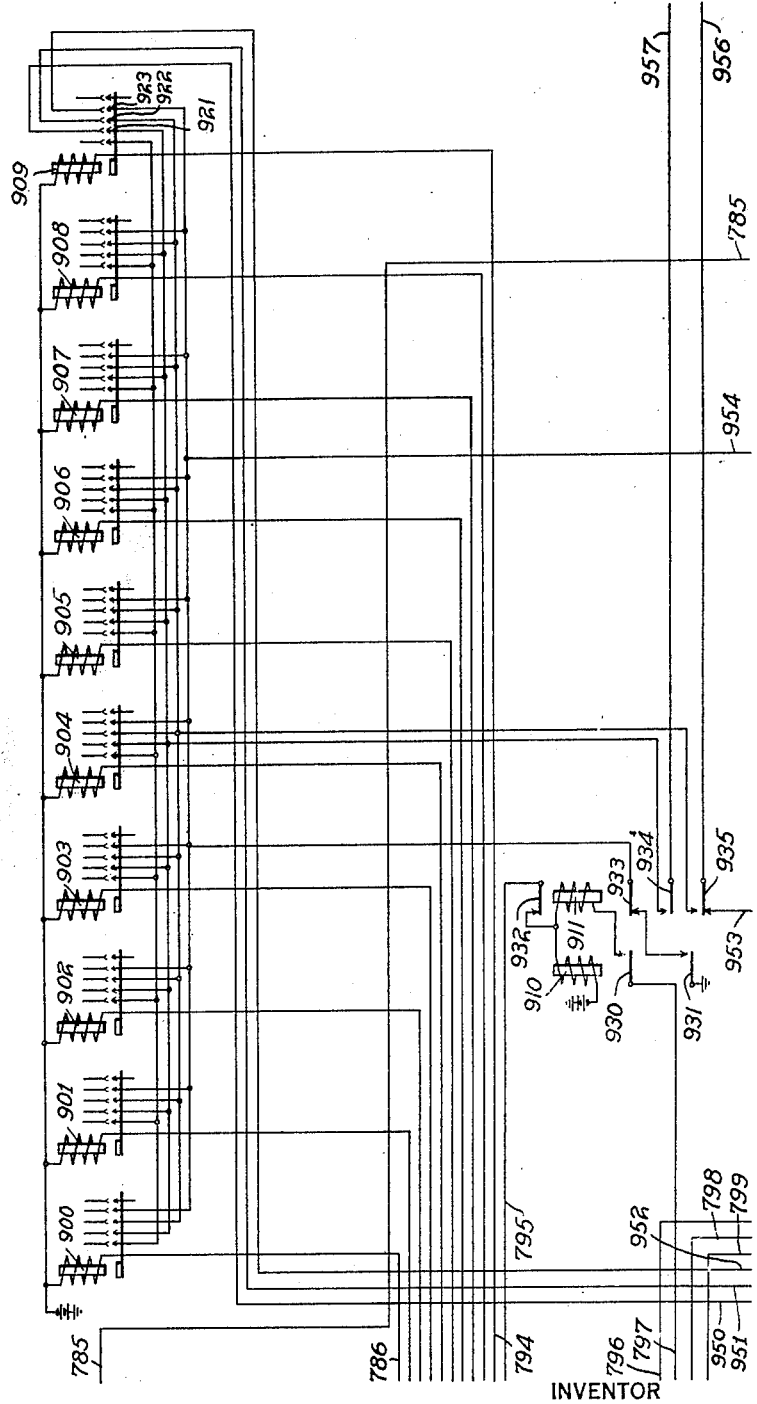
Figure 10:
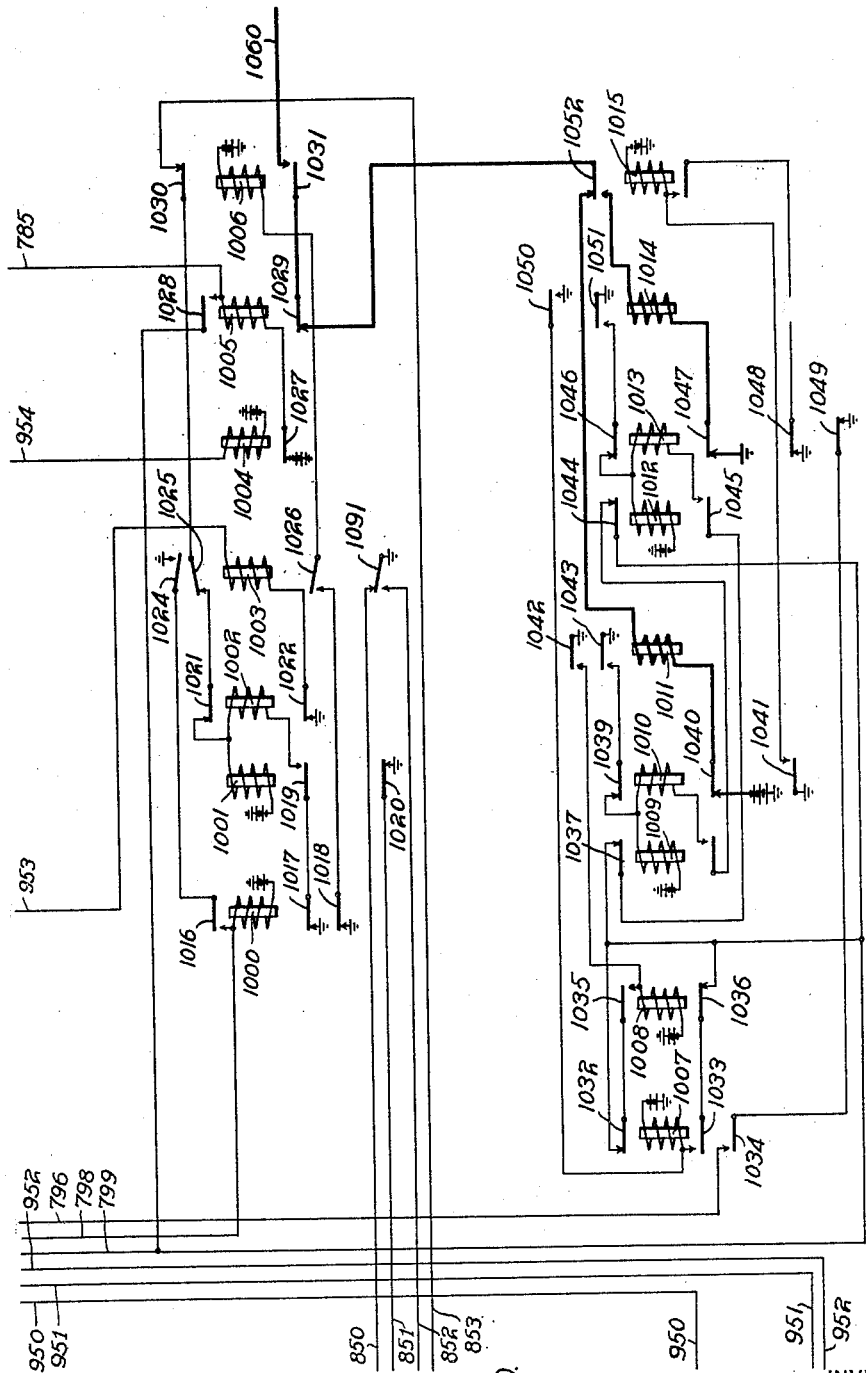
Figure 11:
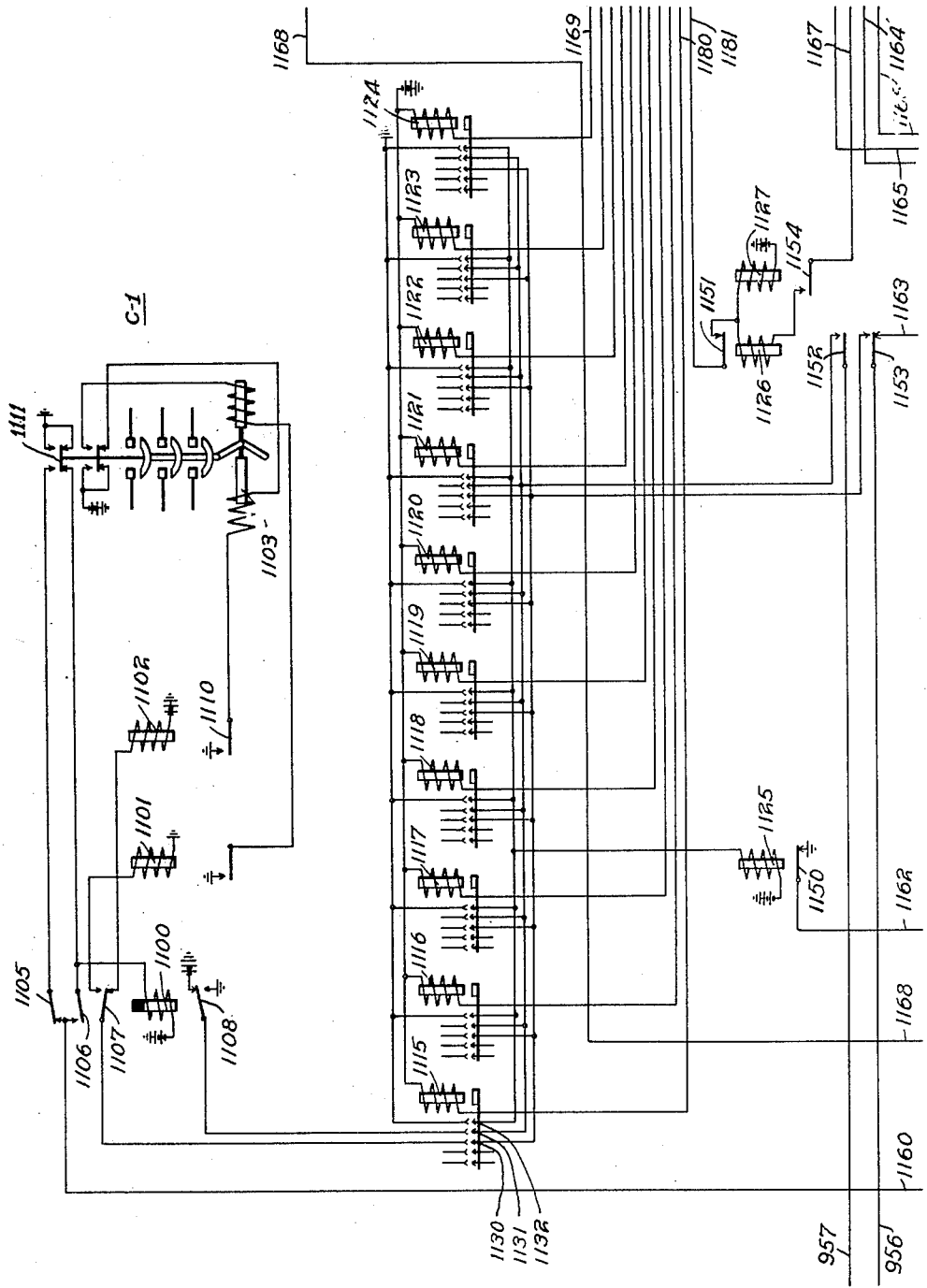
Figure 12:
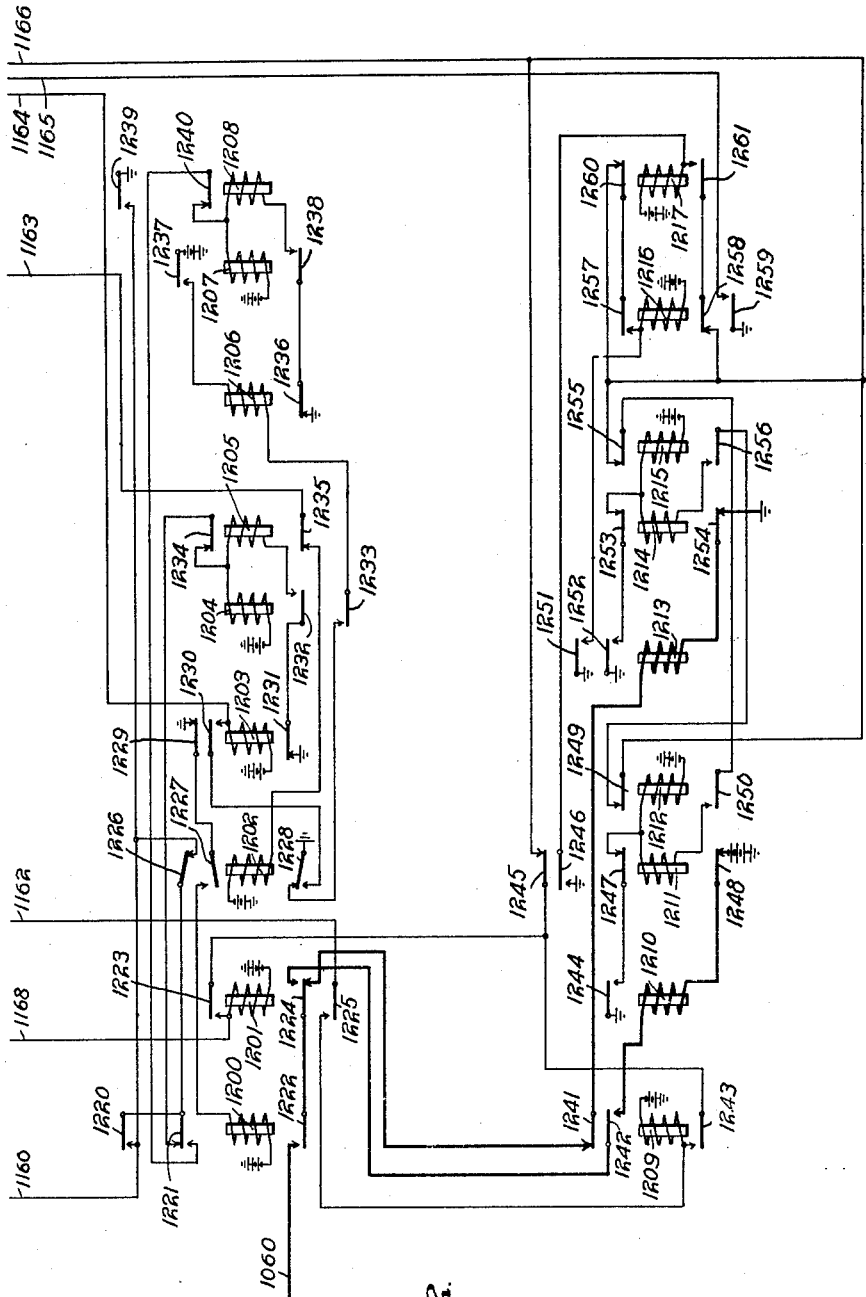
Figure 13:
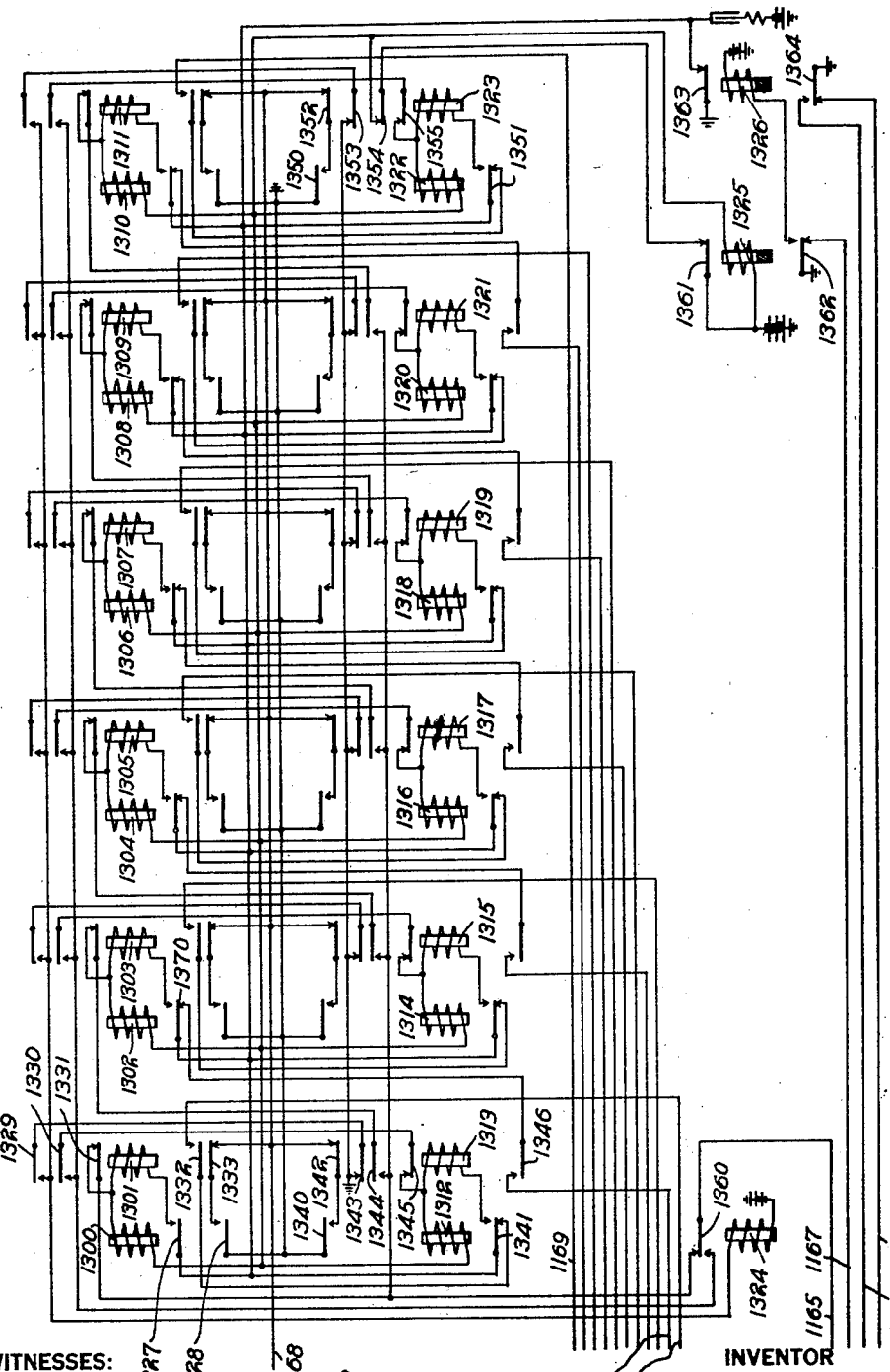

The apparatus and circuits shown in Figs. 1 to 3, inclusive, are those located at the dispatcher's office; the apparatus and circuits shown in Figs. 4 to 10, inclusive, are those located at an intermediate substation; while the apparatus and circuits shown in Figs. 11 to 13, inclusive, are those located in the distant substation. Fig. 14 shows, in simple diagrammatic form, the essential plan of my invention. Fig. 15 shows the manner in which the different sheets are to be placed.

In practicing my invention, I provide a first group of counting relays at the dispatcher's office, a second and third group of counting relays at the intermediate substation, and a fourth group of counting relays at the distant station. The number of relays in the first and second counting relay groups is equal and corresponds in number to the number of apparatus units that it is desired to control and supervise at both the intermediate and distant stations. The number of counting relays in the third and fourth groups are directly proportional to the number of apparatus units that it is desired to control and supervise in the distant station. A group of selecting relays is associated with each group of counting relays. In addition, a first driving circuit is employed to control the operation of the counting relays in the first and second counting relay groups, and a second driving circuit is employed to control the operation of the relays in the third and fourth counting relay groups.

There is provided, at the dispatcher's office, a plurality of keys corresponding in number to the number of apparatus units that it is desired to control in the intermediate and distant stations. Two lamps are associated with each key and are provided for the purpose of apprising the dispatcher of the condition of the apparatus units at the intermediate and distant stations. A plurality of stop keys are also provided at the dispatcher's office. There is one such stop key in the dispatcher's office for each apparatus unit that is disposed in the intermediate substation. These stop keys are provided for the purpose of enabling the dispatcher to select a predetermined apparatus unit and remain in connection therewith so long as he desires.

In order to repeat the signalling operations from the dispatcher's office through the intermediate station to the distant station, a signal repeating circuit is provided.

Referring now to Fig. 14, the various apparatus described in the foregoing may be readily found. When the dispatcher desires to operate one of the apparatus units in the intermediate station, he will operate the particular key associated with this unit and will then operate the start key. By the operation of the start key, the driving circuit brings about the operation of the relays in the first and second counting relay chains in a definite sequence. The energization of these relays controls the operation of the selecting relays.

The driving action is interrupted when the operated key is connected to the desired apparatus unit at the intermediate station. As a result of this operation, a signalling circuit is prepared which may be closed by the dispatcher to control the desired apparatus unit. After such control has been exercised, the action of the driving circuit again functions and the relay selecting apparatus is restored to normal after one cycle of the counting relay chains.

It has been previously explained that the number of counting relays in the first and second relay groups is directly proportional to the number of apparatus units in the intermediate and distant stations. During the operation of the first relays in the group of selecting relays, the apparatus units in the intermediate station are selected and are connected to the corresponding keys and signalling devices at the dispatcher's office. During the operation of the remaining relays in the selecting relay groups, the signal repeating relays are selected at the intermediate station and are connected to the corresponding keys at the dispatcher's office. These signal repeating relays are set up or operated in accordance with the operation of the corresponding key at the dispatcher's office. In a like manner, if these signal-repeating relays have been operated from the distant station in a manner that will be described, these signals will be transmitted to the dispatcher's office when the predetermined signal-repeating relays have been selected by the operation of the selecting relays.

Now, when the dispatcher desires to operate an apparatus unit in the distant station, he will operate the key corresponding to this unit at the dispatcher's office and will then operate the start key. As a result of this operation, the driving circuit is operated to bring about the operation of the relays in the first and second counting relay chains in a definite sequence. These counting relay chains are operated to control the operation of the relays in their associated selecting relay apparatus.

By the operation of the selecting relays, the proper signal-repeating relay or relays are selected and the action of the driving circuit is interrupted until this relay is operated. By the operation of this relay, an answer-back signal is returned to the dispatcher's office in order to inform him that the proper condition has been set up. At the same time, the driving circuit again begins to function.

The selecting apparatus controlled by the first and second counting relay chains is finally restored to normal. Upon this operation, the second driving circuit begins to function to operate the counting relays in the third and fourth counting relay groups. By the operation of these relays, the relays in the selecting relay groups at the intermediate station and distant station are operated in a predetermined sequence.

When the desired apparatus unit is selected, the action of this driving circuit is interrupted and a signal is sent to the distant station that is controlled by the condition of the signal-repeating relay that has been previously operated by the dispatcher. As a result of the operation of the desired apparatus unit at the station, an answer-back signal is sent to the intermediate station to cause another operation of the signal-repeating relay.

The action of the driving circuit is again initiated to complete the cycle of operations, that is, to operate all the counting relays in the third and fourth counting relay groups. When this has occurred, the selecting apparatus controlled by the third and fourth counting relay groups is restored to normal. The action of the first driving circuit is now initiated and this operation brings about the operation of the relays in the first and second counting relay groups. The action of the driving circuit continues until the signal-repeating relay that has been operated by the answer-back signal from the distant station is selected, whereupon its action is interrupted.

As a result of the sending of the signal-repeating relays, the signaling devices that have been selected by the operation of the selecting relays at the dispatcher's office are operated to indicate to the dispatcher that the desired action has occurred at the distant station.

In the event that an apparatus unit is operated automatically at the intermediate station, the first driving circuit is operated to operate the relays of the first and second counting relay groups, and the setting of the signalling devices corresponding to this apparatus unit at the dispatcher's office is changed to indicate this operation to the dispatcher.

In the event that an apparatus unit at the distant station is operated thereat, either by the functioning of circuit-responsive devices or by an operator, the second driving circuit is brought into operation to control the energization of the counting relays in the third and fourth counting relay groups. By this operation, the proper signal-repeating relay is actuated in accordance with the operation of the apparatus unit at the distant station.

The first driving circuit now begins to operate to cause the selection of the signal-repeating relays that have been operated from the distant station. As a result of this operation, the corresponding signalling devices at the dispatcher's office are operated to indicate to the dispatcher the changed condition of the apparatus unit at the distant station.

Referring now more particularly to Fig. 1, relays 100 to 123, inclusive, comprise the counting relay group at the dispatcher's office. Relays 124 to 126, inclusive, control certain actions of the relay selecting apparatus.

In Fig. 2, relays 205 to 214, inclusive, comprise the group of selecting relays at the office. These relays have been shown as a special type of multi-contact relay, but it will be understood that any type of multi-contact relay may be used.

Key K is of the single-throw, non-locking type and is common to all keys, such as K—1. Key K—1 is one of a plurality of control keys that are provided for controlling the operation of the apparatus units in an intermediate and distant station. These keys are locking double-throw keys.

Referring to key K—1, when a handle 219 is turned in one direction, springs 217, 218, 220 and 221 assume a position opposite to that shown. When the handle 219 is turned in the opposite direction, the springs are reoperated to the initial position shown in the drawings. Relays 200 to 204, inclusive, are associated with each key, such as K—1. Relays 200 and 201 have their armatures so disposed with respect to each other that the armature 224 of the relay 201, when in retracted position, is adapted to maintain the armatures 222 and 223 of the relay 200 in an operated position. Relays 202 and 203 are similarly constructed and positioned and control the operation of the signalling devices 225 and 226 to indicate the operation of the corresponding units at one of the stations. The relay 204 is a slow-acting relay of the usual type. Relays 215 and 216 control certain signalling and control operations in a manner that will subsequently appear.

A double-throw switch 260 is provided to connect the key K—1 and the relays 201 to 204, inclusive, to the selecting relay 209, or to the selecting relay 219. This is merely to reduce the complexity of the drawings and, to all intents and purposes, when the switch 260 is operated in the direction opposite to that shown, the key K—1 and its associated apparatus is individual to the selecting relay 209.

Relays 300 to 315, inclusive, (Fig. 3), comprise the driving circuit at the dispatcher's office. Key K—12 is a start key and is of the usual single-throw, non-locking type.

Figure 4:
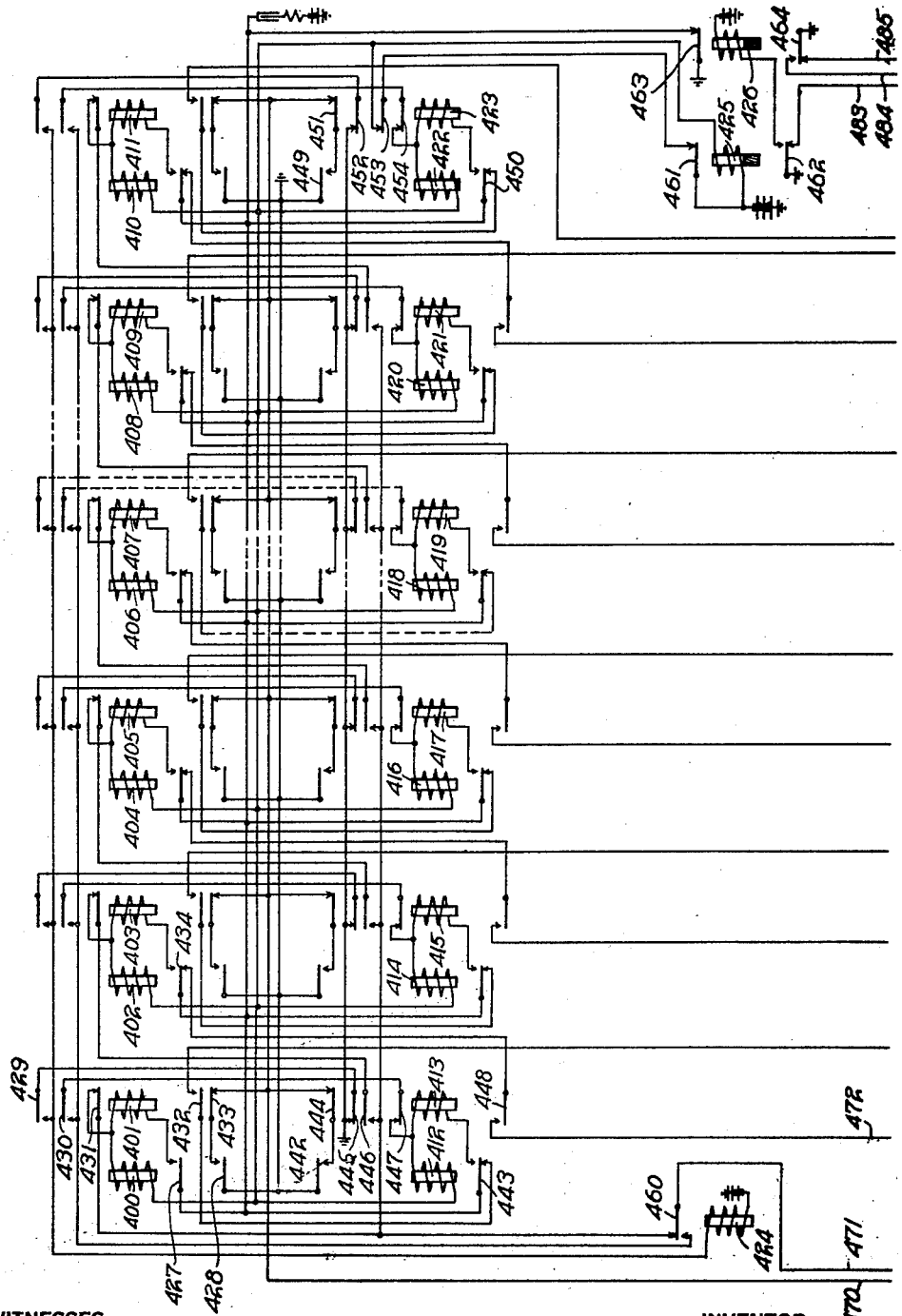

In Fig. 4, relays 400 to 423, inclusive, comprise the second group of counting relays. These relays are located at the intermediate station. Relays 424 to 426, inclusive, control certain releasing and control circuits.

Figure 5:
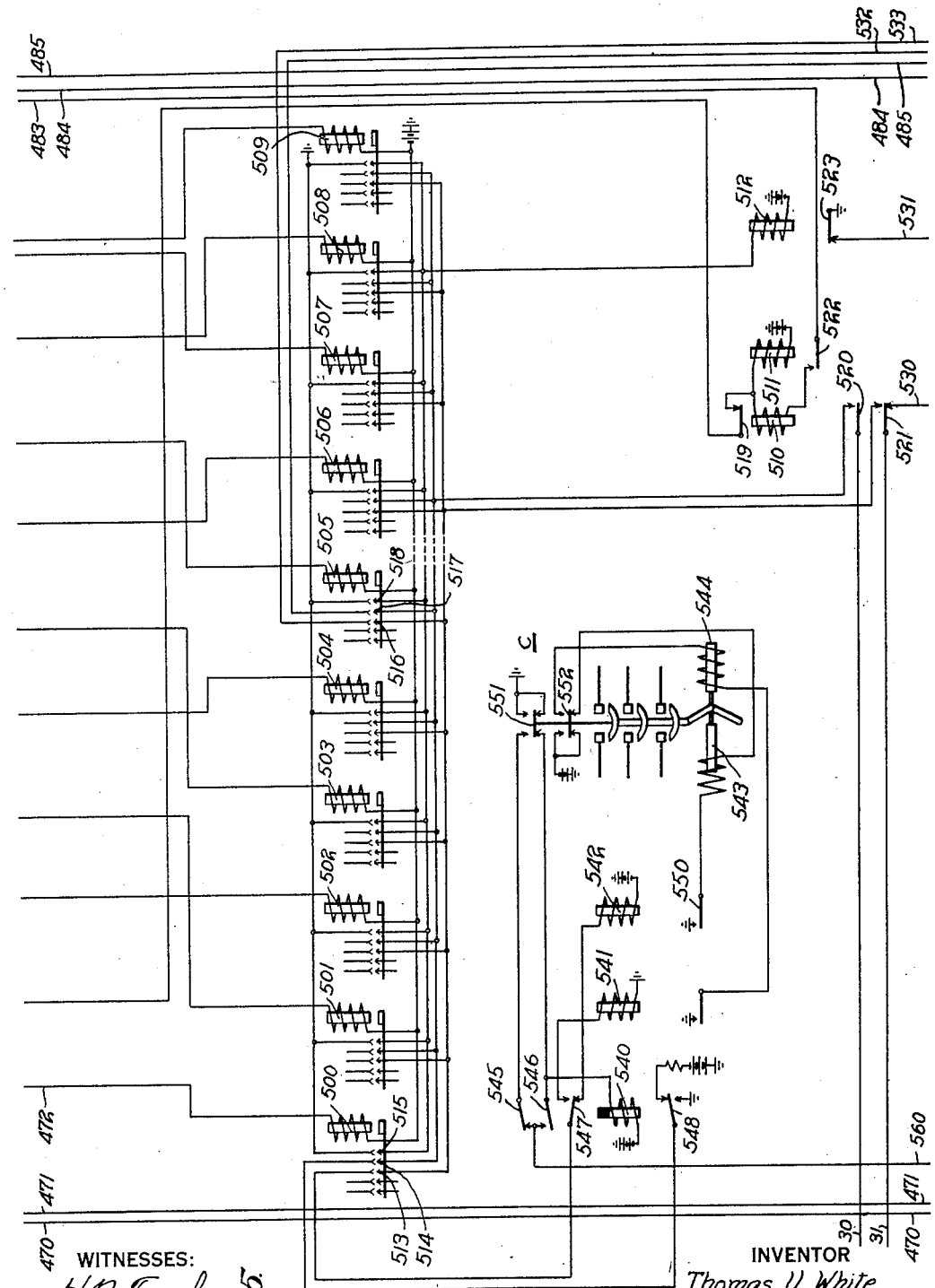

In Fig. 5, relays 500 to 509, inclusive, comprise the group of selecting relays associated with the counting relays of Fig. 4. There are three relays associated with each apparatus unit that it is desired to control at the intermediate station. Relays 540 to 542, inclusive, are the relays associated with the circuit interrupter C. The circuit interrupter C may be of any usual or well known type and may perform any desired function at the station, such as connecting two feeder circuits together. Relays 510 to 512, inclusive, control certain selecting operations, as will appear.

Figure 6:
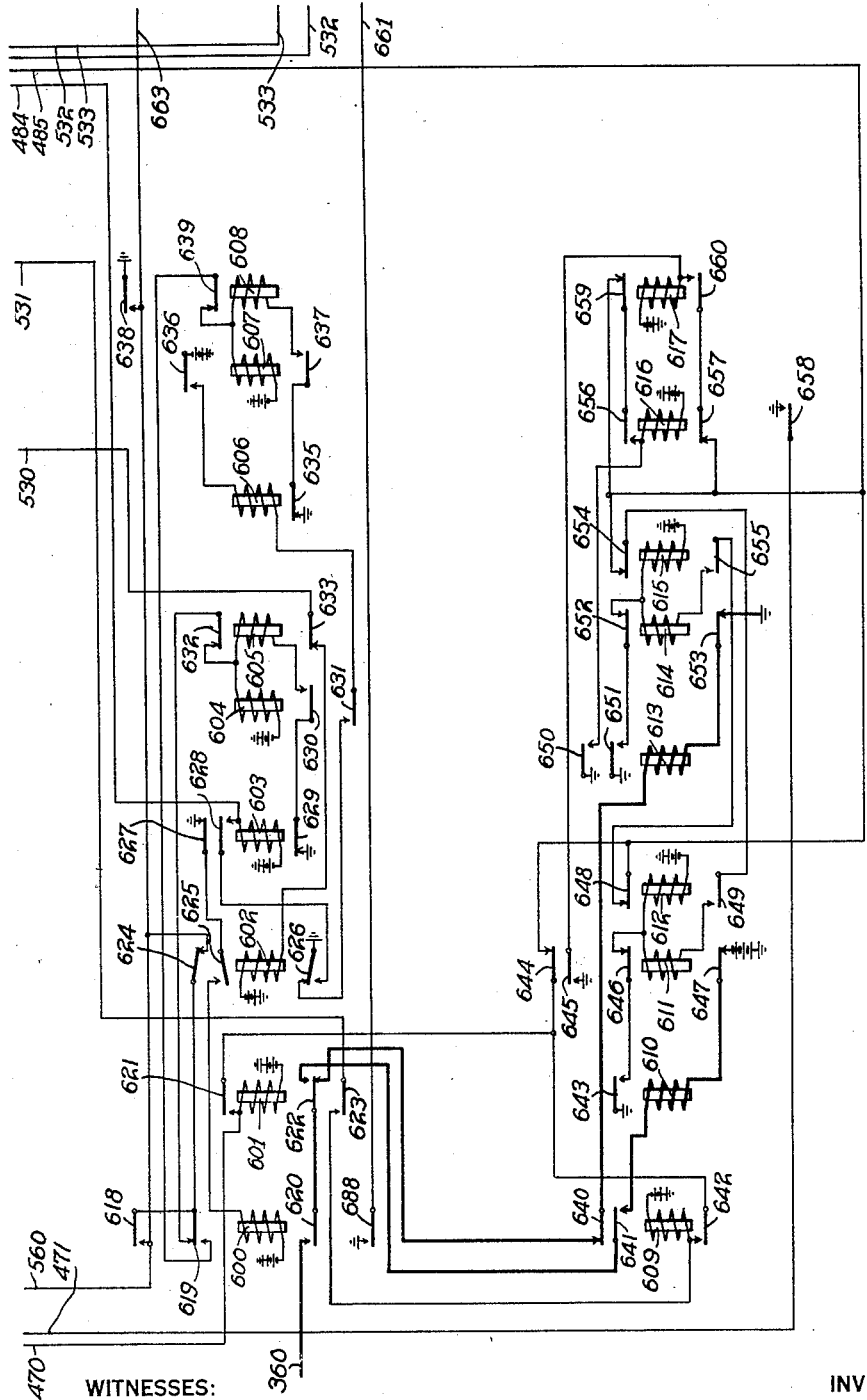
Figure 7:
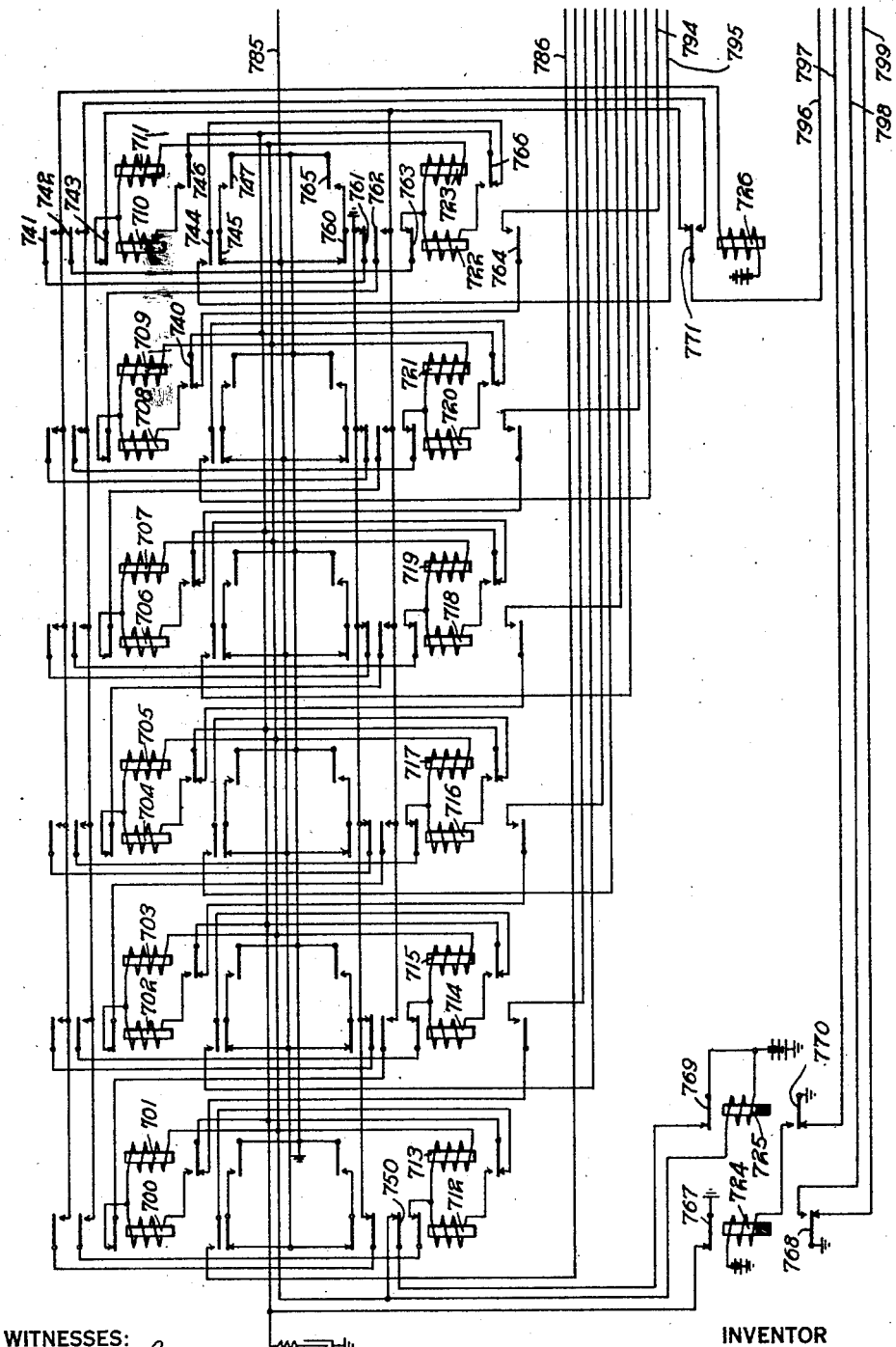

In Fig. 6, relays 600 to 617, inclusive, comprise the first driving circuit at the intermediate station.

Relays 700 to 723, inclusive, (Fig. 7), comprise the third group of counting relays and are located at the intermediate station. Relays 724 to 726, inclusive, control certain releasing operations.

Figure 8:
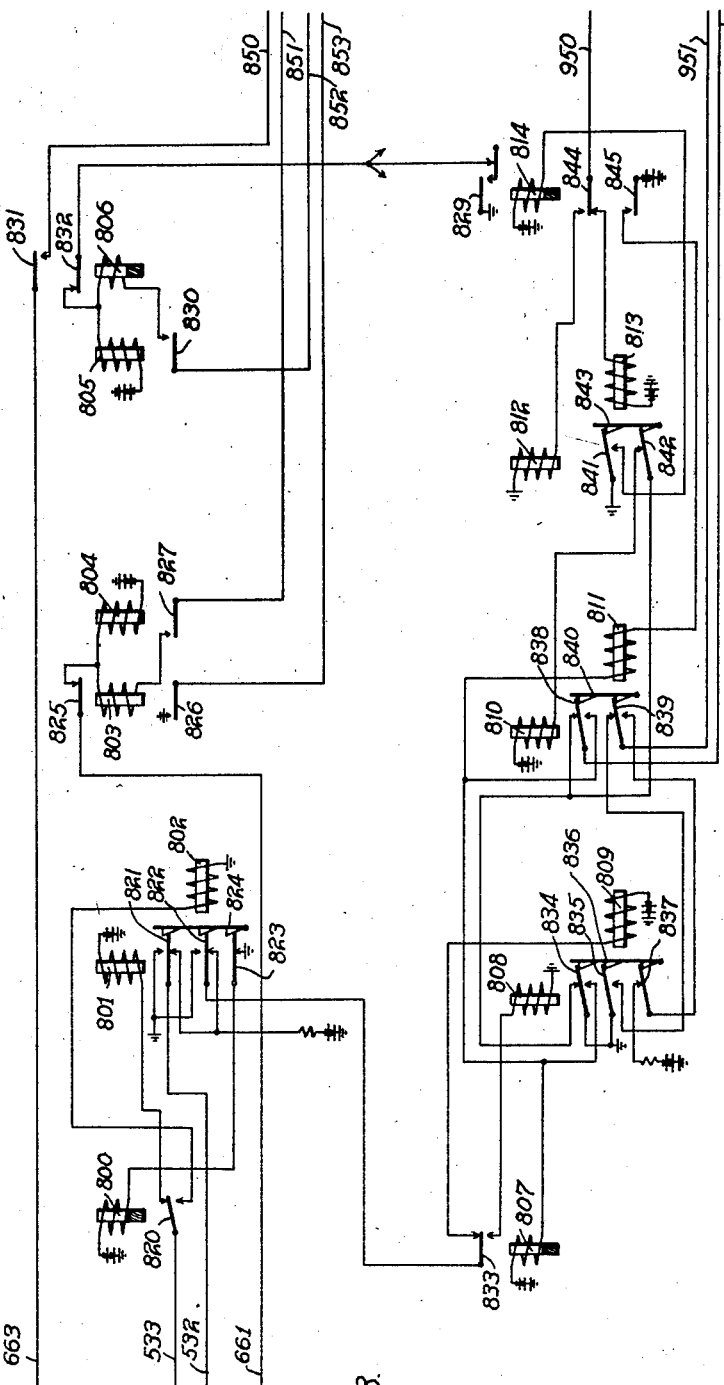

In Fig. 8, relays 800 to 814, inclusive, comprise the signal-repeating relays. Relays 801 and 802, 808 and 809, 810 and 811, 812 and 813 have their armatures mechanically latched in a manner similar to that already described with respect to the armatures of the relays 200 and 201.

In Fig. 9, relays 900 to 909, inclusive, comprise the group of selecting relays associated with the third group of counting relays. Relays 910 and 911 control certain selecting operations.

In Fig. 10, relays 1000 to 1015, inclusive, comprise a portion of the second driving circuit at the intermediate station.

In Fig. 11, relays 1115 to 1124, inclusive, comprise the group of selecting relays associated with the fourth group of counting relays at the distant station. There are three relays associated with each apparatus unit at this station, relays 1100 to 1102, inclusive, being the relays associated with the circuit interrupter C—1 at the distant station. The circuit interrupter C—1 may be of the same type and function in a manner similar to the circuit interrupter C already described. Relays 1125 and 1126 control certain selecting operations.

Relays 1200 to 1217, inclusive, in Fig. 12, comprise the portion of the second driving circuit at the distant station.

In Fig. 13, relays 1300 to 1323, inclusive, comprise the fourth group of counting relays. These relays are located at the distant station. Relays 1324 to 1326, inclusive, control certain operations of the selecting apparatus in a manner that will appear.

Fig. 14, as previously mentioned, shows a diagrammatic view of my invention.

Fig. 15 shows the manner in which the various sheets are to be placed in order that the following detailed description may be readily comprehended.

In the relay group at the dispatcher's office (Fig. 1), only twenty of the thirty relays have been shown. It will be obvious how the other ten counting relays may be inserted in the dotted connections shown in this relay. In a like manner, in Fig. 2, only ten of the fifteen selecting relays have been shown. Likewise, at the intermediate station, only twenty of the thirty counting relays and ten of the fifteen selecting relays have been shown. The manner in which these additional relays will be added will be obvious.

When the selecting apparatus is normal, a circuit is completed which extends from ground by way of back contact and armature 321, holding relay 303, conductor 26, back contact and armature 259, trunk conductor 31, armature 521 and its back contact, conductor 530, armature 633 and its back contact, and holding relay 602 to battery. The holding relays 303 and 602 are energized in series over this circuit. The relay 303 is operated to open one point in the locking circuit of the relay 300 at armature 322, to prepare a starting circuit at armature 323, and to open one point in the circuit of the relay 306 at armature 324.

At the intermediate station, the holding relay 602 is energized to prepare a starting circuit at armature 624, to open one point in the circuit of the relay 600 at armature 625, to open one point in the locking circuit of the relay 603 at armature 626, and to prepare a point in the circuit of the relay 606 at the front contact of this armature.

There is a second holding circuit completed which extends from ground by way of back contact and armature 1022, holding relay 1003, conductor 953, back contact and armature 935, trunk conductor 956, armature 1153 and its back contact, conductor 1163, armature 1235 and its back contact, and holding relay 1202 to battery.

The holding relay 1003 at the intermediate station is operated to open one point in the locking circuit of the relay 1000 at armature 1024, to prepare a start circuit at armature 1025, and to open one point in the circuit of the relay 1006 at armature 1026. The holding relay 1202 at the distant station is energized to prepare a point in the starting circuit at armature 1226, to open one point in the circuit of the relay 1200 at armature 1227, to open the locking circuit of the relay 1203 at armature 1228, and to prepare a circuit for the relay 1206 at the front contact of this armature.

The first-mentioned holding circuit extends between the dispatcher's office and the intermediate station, while the second holding circuit extends from the intermediate station to the distant station. These holding circuits maintain the selecting apparatus in a normal position, as will appear.

In order to describe the selecting operation, it will first be assumed that the dispatcher desires to bring about the operation to a closed position of the circuit interrupter C at the intermediate station. In order to accomplish this result, the dispatcher will operate the key K—1 associated with this unit into the position opposite from that shown and will then operate the start key K—12. It will be assumed that the switch 260 is in such position that the key K—1 is selected by the operation of the selecting relay 214.

When the start key K—12 is operated, a circuit is completed that extends from ground by way of the springs of said key, back contact and armature 328, armature 323 and its front contact, armature 320 and its back contact, and relay 301 to battery. The relay 301 is energized to complete a circuit extending from ground by way of back contact and armature 317, armature 319 and its front contact, relay 302 and relay 301 to battery.

The relay 302 is short-circuited so long as the key K—12 is depressed. When this key is released, the short-circuit is removed from the relay 302 and this relay is operated to open the holding circuit and the relays 303 and 602 are deenergized.

Upon being deenergized, the relay 303 completes a circuit for the relay 306 at armature 324, opens an additional point in the start circuit at armature 323, and at armature 322 prepares a locking circuit for the relay 300. The relay 306 is operated to open another point in the starting circuit at armature 328, and to prepare a point in the driving circuit at armature 329.

At the intermediate station, the relay 602 is deenergized to open one point in the starting circuit at armature 624, to complete a circuit for the relay 600 at armature 625, and to prepare a point in the locking circuit of the relay 603 at armature 626. The relay 600 is energized to prepare a new starting circuit at armatures 618 and 619, and to complete the driving circuit at armature 620.

The driving circuit now extends from battery by way of back contact and armature 338, line relay 311, back contact and armature 350, back contact and armature 327, armature 329 and its front contact, trunk conductor 360, front contact and armature 620, armature 622 and its back contact, back contact and armature 640, relay 613, and back contact and armature 653 to ground. The line relays 311 and 613 are now energized in series.

When the line relay 311 is energized, a circuit is completed for the relay 308 at armature 340, and a circuit is completed at armature 341 for the relay 309. The relay 308 is energized to open one point in the locking circuit of the relay 307 at armature 334, and to establish a locking circuit for itself at armature 333 over a path that extends from ground by way of armature 183 and its back contact, conductor 25, back contact and armature 330, armature 333 and its front contact, and relay 308 to battery. The relay 309 is energized to open one point in the circuit of the relays 312 and 313 at armature 335, and at armature 336 to complete a circuit extending from ground upon grounded conductor 25 by way of armature 342 and its back contact, armature 336 and its front contact, relay 310 and relay 309 to battery. The relay 310 is not energized over this circuit until the original energizing circuit of the relay 309 is opened.

At the intermediate station, the line relay 613 is energized to complete a circuit for the relay 616 at armature 650, and to complete a circuit for the relay 615 at armature 651. The relay 615 is energized to open one point in the circuit of the relays 611 and 612 at armature 654, and to complete a circuit at armature 655 over a path that extends from ground by way of armature 464 and its back contact, conductor 485, armature 648 and its back contact, armature 655 and its front contact, relay 614 and relay 615 to battery. The relay 614 is not energized so long as the original energizing circuit of the relay 615 is completed.

The relay 616 is energized to open one point in the locking circuit of the relay 617 at armature 657, to establish a locking circuit for itself at armature 656, that extends to ground on grounded conductor 485, and to complete a circuit at armature 658 that extends from ground by way of front contact of said armature, conductor 471, armature 460 and its back contact, armature 431 and its back contact, relay 400, back contact and armature 453, and back contact and armature 461 to battery.

The counting relay 400 is energized over the above circuit and operates to complete a circuit at armature 427 over a path that extends from ground by way of armature 463 and its back contact, armature 427 and its front contact, relay 401, relay 400, back contact and armature 453, and back contact and armature 461 to battery, and to complete a circuit at armature 428 over a path that extends from ground by way of said armature and its front contact, armature 433 and its back contact, conductor 470, and relay 601 to battery. The relay 401 is not operated until the original energizing circuit of the relay 400 is opened.

The relay 601 is energized to establish a locking circuit for itself to ground upon grounded conductor 485 at armature 621, to open the circuit of the line relays 311 and 613 at armature 622, and to complete a circuit at armature 623 that extends from ground by way of armature 523 and its back contact, conductor 531, armature 623 and its front contact and relay 609 to battery. The relay 609 is energized to establish a locking circuit for itself at armature 642, to prepare a circuit for the line relay 609 at armature 641, and to open a point in the circuit of the line relay 613 at armature 640.

When the circuit of the line relay 613 and 311 is opened, by the operation of the armature 622 of the relay 601, these relays are deenergized. The relay 613 is deenergized to remove the short-circuit from the relay 614 at armature 651. The relay 614 is immediately operated to open another point in the circuit of the relay 615 at armature 652, and to open another point in the circuit of the line relay 613 at armature 653.

When the relay 311 is deenergized, the short-circuit is removed from the relay 310 and this relay is operated to open another point in the original energizing circuit of the relay 309 at armature 337, to open another point in the circuit of the relay 311 at armature 338, and to complete a circuit at armature 339 for the relay 315. The relay 315 is energized to establish a locking circuit for itself at armature 351, and to complete the control circuit at armature 350.

The control circuit now extends from ground by way of back contact and armature 345, line relay 314, front contact and armature 350, back contact and armature 327, armature 329 and its front contact, trunk conductor 360, front contact and armature 620, armature 622 and its front contact, armature 641 and its front contact, relay 610, and armature 647 and its back contact to battery. The line relays 314 and 610 are energized over this circuit.

The relay 314, upon operating, completes a circuit for the relay 312 at armature 349, and completes a circuit for the relay 307 at armature 348. The relay 312 is operated to open the circuit of the relays 309 and 310 at armature 342, and to prepare a circuit at armature 343 for the relay 313. The relay 310 is deenergized to prepare a circuit for the relay 309 at armature 337, to prepare a circuit for the relay 311 at armature 338, and to open the original energizing circuit for the relay 315 at armature 339. The relay 309 is deenergized to open one point in the circuit of the relay 310 at armature 336, and to complete a circuit at armature 335 that extends from grounded conductor 25 by way of back contact and armature 335, armature 343 and its front contact, relay 313 and relay 312 to battery. The relay 313 is short-circuited as long as the original energizing circuit of the relay 312 is completed.

The relay 307 is energized to prepare a locking circuit for itself at armature 331, to open the locking circuit of the relay 308 at armature 330, and to complete an impulsing circuit at armature 332. The relay 308 is deenergized to complete the locking circuit of the relay 307 to ground upon grounded conductor 25 at armature 334.

The previously mentioned impulsing circuit extends from ground by way of back contact and armature 347, armature 332 and its front contact, conductor 22, armature 186 and its back contact, armature 137 and its back contact, relay 111, back contact and armature 144, and back contact and armature 184 to battery.

The relay 111 is energized to complete a circuit at armature 140 over a path that extends from ground by way of armature 182 and its back contact, armature 140 and its front contact, relay 110, relay 111, back contact and armature 144, and back contact and armature 184 to battery, and to complete a circuit at armature 141 that extends from ground by way of said armature and its front contact, armature 139 and its back contact, conductor 10, relay 305 and armature 325 and its back contact to battery. The relay 305 is energized over this circuit and operates to establish a locking circuit for itself upon grounded conductor 25 at armature 326, and to open the driving circuit, including the line relays 314 and 610, at armature 327.

At the intermediate station, the line relay 610 is operated to complete a circuit for the relay 612 at armature 643. The relay 612 is energized to open the circuit of the relays 614 and 615 at armature 648, and to prepare a circuit for the relay 611 at armature 649. The relay 614 is deenergized to prepare a circuit for the relay 615 at armature 652, and to prepare a circuit for the relay 613 at armature 653. The relay 615 is deenergized to open one point in the circuit of the relay 614 at armature 655, and to complete a circuit that extends from ground through grounded conductor 485 by way of back contact and armature 654, armature 649 and its front contact, relay 611 and relay 612 to battery. This circuit is not effective to energize the relay 611 until the short-circuit is removed from this relay by the deenergization of the relay 610.

When the driving circuit is opened, the relay 314 is deenergized as before mentioned. Upon being deenergized, the relay 314 opens one point in the original energizing circuit of the relay 307 at armature 348, and at armature 349 removes the short-circuit from the relay 313. The relay 313 is immediately operated to open another point in the original circuit for the relay 312 at armature 344, to open another point in the circuit of the line relay 314 at armature 345, to open the locking circuit of the relay 315 at armature 346, and to open the impulsing circuit at armature 347. The relay 315 is deenergized to disconnect the line relay 314 from the driving circuit and to connect the line relay 311 thereto at armature 350.

When the impulsing circuit is opened, the short-circuit is removed from the counting relay 110 and this relay is permitted to operate. Upon operating, the relay 110 opens another point in the original energizing circuit of the relay 111 at armature 137, prepares a circuit for the counting relay 123 at armature 136, removes ground from the conductor 10 at armature 139, completes a circuit at armature 135 that extends from ground by way of back contact and armature 139, armature 135 and its front contact, and relay 126 to battery, and at armature 138 completes a circuit that extends from ground by way of armature 182 and its back contact, armature 154 and its back contact, armature 138 and its front contact, conductor 21, armature 256 and its back contact, and relay 215 to battery.

The relay 215 is energized to complete a circuit that extends from ground by way of armature 185 and its back contact, conductor 23, armature 254 and its front contact, relay 216 and relay 215 to battery, and at armature 255 completes a circuit that extends from ground by way of said armature and its front contact, back contact and armature 257, conductor 27, and relay 304 to battery. The relay 216 is short-circuited so long as the original energizing circuit of the relay 215 is completed.

The relay 304 is energized to open the locking circuit of the relay 305 which is deenergized. The relay 305 retracts the armature 327 to prepare one point in the driving circuit.

At the intermediate station, the line relay 610 is deenergized by the opening of the driving circuit to remove the short-circuit from the relay 611. As a result of this operation, the relay 611 is operated to open the locking circuit of the relays 609 and 601 at armature 644, to complete a circuit for the relay 617 at armature 645, to open an additional point in the original circuit of the relay 612 at armature 646, and to open an additional point in the original circuit of the line relay 610 at armature 647.

The relay 617 is energized to open the locking circuit of the relay 616 at armature 659, and to prepare a locking circuit for itself at armature 660. The relay 616 is deenergized to complete a locking circuit for the relay 617 at armature 657 and to open the impulsing circuit at armature 658. By the opening of the impulsing circuit, the short-circuit is removed from the counting relay 401 and this relay is energized.

Upon operating, the relay 401 opens one point in the original energizing circuit of the relay 400 at armature 431, prepares a circuit for the counting relay 412 at armature 430, completes a circuit at armature 429 that extends from ground by way of back contact and armature 446, armature 429 and its front contact, and relay 424 to battery, removes ground from conductor 470 at armature 433, and at armature 432 completes a circuit that extends from ground by way of armature 463 and its back contact, armature 443 and its back contact, armature 432 and its front contact, conductor 473, armature 519 and its back contact, and relay 511 to battery. The relay 424 is energized to prepare another point in the circuit of the counting relay 412.

The removal of ground from conductor 470 causes the opening of the original energizing circuit of the relay 601. The relay 601 is deenergized to open the original circuit of the relay 609 at armature 623, and to connect the driving circuit to the back contact of armature 640 of relay 609 at armature 622. The relay 609 is deenergized to connect the line relay 613 to the driving circuit and to open another point in the circuit of the relay 610 at armature 641.

The relay 511 is energized to complete a circuit that extends from ground by way of armature 462 and its back contact, conductor 483, armature 522 and its front contact, relay 510 and relay 511 to battery. This circuit is not effective so long as the original circuit for the relay 511 is maintained.

By the deenergization of the relays 601 and 609, the driving circuit is completed. This driving circuit extends from battery by way of back contact and armature 338, line relay 311, back contact and armature 350, back contact and armature 327, armature 329 and its front contact, conductor 360, front contact and armature 620, armature 622 and its back contact, back contact and armature 640, line relay 613, and armature 653 and its back contact to ground. The line relays 311 and 613 are energized over this circuit.

The line relay 311 is operated to complete a circuit for the relay 308 at armature 340, and to complete a circuit for the relay 309 at armature 341. The relay 309 is energized to open the circuits of the relays 312 and 313 at armature 335, and to prepare a circuit for the relay 310 at armature 336. The relay 313 is deenergized to prepare a circuit for the relay 312 at armature 344, to prepare a circuit for the line relay 314 at armature 345, to close one point in the locking circuit of the relay 315 at armature 346, and to close one point in the impulsing circuit at armature 347. The relay 312 is deenergized to open one point in the circuit of the relay 313 at armature 343, and to complete the circuit of the relay 310 at armature 342. The relay 310 is not energized so long as the original circuit of the relay 309 is maintained. The relay 308 is operated to open the locking circuit of the relay 307 at armature 334, and to prepare a locking circuit for itself at armature 333. The relay 307 is deenergized to complete the locking circuit of the relay 308 at armature 330, and to open another point in the impulsing circuit at armature 332.

At the intermediate station, the relay 613 is energized to complete a circuit for the relay 616 at armature 650, and to complete a circuit for the relay 615 at armature 651. The relay 615 is operated to open the circuit of the relays 611 and 612 and to prepare a circuit for the relay 614. The relay 611 is deenergized to prepare a circuit for the relay 612 at armature 646, to prepare a circuit for the line relay 610 at armature 647, to open the original energizing circuit of the relay 617 at armature 645, and to prepare a locking circuit for the relays 609 and 601 at armature 644. The relay 612 is deenergized to complete the circuit of the relay 614. This relay is short-circuited until the line relay 613 is deenergized.

The relay 616 is energized to prepare a locking circuit for itself at armature 656, to open the locking circuit of the relay 617 at armature 657, and to complete an impulsing circuit at armature 658. The relay 617 is deenergized to close the locking circuit of the relay 616.

The impulsing circuit just mentioned extends from ground by way of front contact and armature 658, conductor 471, armature 460 and its front contact, front contact and armature 430, armature 447 and its back contact, counting relay 412, back contact and armature 453, and back contact and armature 461 to battery.

The counting relay 412 is energized over this circuit and operates to open the circuit of the relay 510 at armature 443, to complete a circuit at the front contact of this armature that extends from ground by way of armature 463 and its back contact, armature 443 and its front contact, relay 413, relay 412, back contact and armature 453, and back contact and armature 461 to battery, and at armature 442 completes a circuit that extends from ground by way of said armature and its front contact, armature 444 and its back contact, conductor 470, and relay 601 to battery. The circuit for the relay 413 is not effective to energize this relay until the original circuit of the relay 412 is opened.

The relay 601 is energized to open the driving circuit including the line relays 311 and 613 at armature 622, to complete a locking circuit for itself at armature 621, and to complete a circuit for the relay 609 at armature 623. The relay 609 is energized to establish a locking circuit for itself at armature 642, and to prepare the driving circuit by connecting the relay 610 thereto at armature 641.

By the opening of the driving circuit, the line relay 613 is deenergized to remove the short-circuit from the relay 614. The relay 614 is energized to open another point in the circuit of the relay 613 and to open another point in the circuit of the relay 615.

As before mentioned, the operation of the relay 412 opens the original circuit for the relay 511. This operation causes the removal of the short-circuit from the relay 510. This relay is operated to prepare signalling and control circuits at armatures 520 and 521, respectively.

At the dispatcher's office, when the driving circuit is opened, the relay 311 is deenergized to remove the short-circuit from the relay 310. The relay 310 operates to open one point in the original circuit for the relay 309 at armature 337, to open another point in the circuit of the line relay 311 at armature 338, and to complete a circuit for the relay 315 at armature 339. The relay 315 is energized to connect the line relay 314 to the driving circuit at armature 350, and to establish a locking circuit for itself at armature 351. The driving circuit, including the line relays 314 and 610 in series, is now completed.

The line relay 314 is energized to complete a circuit for the relay 312 and for the relay 307. The relay 312 is operated to open the circuit of the relays 309 and 310 at armature 342, and to prepare a circuit for the relay 313. The relay 310 is deenergized to prepare circuits for the relays 311 and 309 at armatures 337 and 338, respectively, and to open the original energizing circuit of the relay 315 at armature 339. The relay 309 is deenergized to complete a circuit for the relay 313. This latter operation is ineffective until the short-circuit is removed from the relay 313 by the deenergization of the relay 314.

The relay 307 is operated to prepare a locking circuit for itself at armature 331, to open the locking circuit of the relay 308 at armature 330, and to complete an impulsing circuit at armature 332. The relay 308 is deenergized to complete the locking circuit of the relay 307.

The impulsing circuit extends from ground by way of back contact and armature 347, armature 332 and its front contact, conductor 22, armature 186 and its front contact, front contact and armature 136, armature 151 and its back contact, counting relay 123, back contact and armature 144, and back contact and armature 184 to battery.

The counting relay 123 is energized over this circuit and operates to open the circuit of the relay 215 at armature 154, to complete a circuit for the relay 122 at the front contact of this armature over a path that may be traced from ground by way of armature 182 and its back contact, armature 154 and its front contact, relay 122, relay 123, back contact and armature 144, and back contact and armature 184 to battery, and to prepare a circuit at armature 153 that extends from ground by way of said armature and its front contact, armature 148 and its back contact, conductor 10, relay 305 to armature 325. The counting relay 122 is not operated over this circuit by reason of the fact that it is shunted so long as the original circuit of the relay 123 is maintained.

By the removal of ground from conductor 21, the original circuit for the relay 215 is opened with the consequence that the short-circuit is removed from the relay 216. The relay 216, upon operating, opens an additional point in the original circuit of the relay 215 at armature 256, opens the circuit of the relay 304 at armature 257, and connects the signalling and control conductors 31 and 32, at armatures 258 and 259, to the contacts of the selecting relays.

The relay 304 is deenergized to complete a circuit for the relay 305, previously traced. The relay 305 is energized to establish a locking circuit for itself at armature 326 and to open the driving circuit, including the line relays 314 and 610, at armature 327. The line relay 314 is immediately deenergized to open the original energizing circuit of the relay 307 and to remove the short-circuit from the relay 313. The relay 313 is energized to open another point in the original circuit of the relay 312 at armature 344, to open another point in the circuit of the relay 314 at armature 345, to open the locking circuit of the relay 315 at armature 346, and to remove ground from the impulsing circuit at armature 347. The relay 315 is deenergized to connect the line relay 311 to the driving circuit.

By the opening of the impulsing circuit, the short-circuit is removed from the relay 122 and this relay is permitted to operate. Upon being energized, the relay 122 removes ground from conductor 10 at armature 148, opens the circuit of relay 126 at armature 149, prepares a circuit for the counting relay 109 at armature 150, and at armature 152 completes a circuit that extends from ground by way of armature 182 and its back contact, armature 134 and its back contact, armature 152 and its front contact, conductor 20, and selecting relay 214 to battery. The relay 126 is deenergized to prepare a point in the circuit of the counting relay 109 at armature 186 and its back contact.

The removal of ground from conductor 10 causes the opening of the original energizing circuit of the relay 305. This relay is not deenergized, however, by reason of the fact that its locking circuit remains closed.

The selecting relay 214 is operated to complete a circuit for the signalling device 242 at spring 250, to prepare a signalling circuit at spring 251, to prepare a control circuit at spring 252, and to prepare a point in the circuit of the relay 304 at spring 253. The operation of the signalling device 242 apprises the dispatcher of the selecting position of the selecting relays. The circuit of the relay 304 is not completed by reason of the fact that the key K—1 is in a position opposite to that shown, and ground is removed from the conductor extending to the springs of the key K—11.

At the intermediate station, the line relay 610 is deenergized, when the driving circuit is opened, to remove the short-circuit from the relay 611. The relay 611 is operated to open another point in the original circuit of the relay 612 at armature 646, to open a second point in the circuit of the line relay 610 at armature 647, to complete a circuit for the relay 617 at armature 645, and to open the locking circuits of the relays 601 and 609 at armature 644.

The relay 617 is energized to open the locking circuit of the relay 616 at armature 659, and to prepare a locking circuit for itself at armature 660. The relay 616 is deenergized to complete the locking circuit of the relay 617 at armature 657 and to open the impulsing circuit at armature 658. By the latter operation, the short-circuit is removed from the counting relay 413 and this relay is permitted to operate.

Upon being energized, the relay 413 removes ground from conductor 470 at armature 444, opens the circuit of the relay 424 at armature 445, prepares a circuit for the counting relay 402 at armature 446, opens another point in the original circuit of the relay 412 at armature 447, and at armature 448 completes a circuit that extends from ground by way of armature 463 and its back contact, armature 434 and its back contact, armature 448 and its front contact, conductor 472, and selecting relay 500 to battery. The selecting relay 500 is energized to prepare a signalling circuit at spring 514, to prepare a control circuit at spring 513, and to complete a circuit at spring 515 for the relay 512. The relay 424 is deenergized to prepare another point in the circuit of the relay 402.

The removal of ground from conductor 470 brings about the deenergization of the relay 601. The relay 601 is deenergized to prepare a circuit for the line relay 613 and to open the circuit of the relay 609. The relay 609 is deenergized to open another point in the circuit of the line relay 610 and to prepare another point in the circuit of the line relay 613. The relay 512 is energized to open another point in the circuit of the relay 609.

The operation of the driving circuit is not completed by reason of the fact that the relay 305 is locked energized. In order for the dispatcher to cause the operation of the circuit breaker C, he will operate the common control key K. As a result of this operation, a circuit is completed which extends from ground by way of the upper springs of key K, working contact of spring 217 of key K—1 and said spring, front contact and armature 223, switch 260, working contact of spring 252 and said spring, front contact and armature 259, trunk conductor 31, armature 521 and its front contact, spring 513 and its working contact, armature 547 and its front contact, and relay 542 to battery. The relay 542 is energized to complete a circuit for the closing coil 543 of the circuit breaker C. The closing coil 543 brings about the closure of the circuit interrupter in a well known manner.

Simultaneously with the completion of this control circuit, there is a signalling circuit completed that extends from battery by way of front contact and armature 548, working contact of spring 514 and said spring, front contact and armature 520, conductor 30, armature 258 and its front contact, spring 251 and its working contact, switch 260, armature 231 and its back contact and relay 203 to battery.

Inasmuch as the proper signalling device 226 is operated to indicate that the circuit interrupter is in its open position, there is no change in the signalling devices. The action of the circuit interrupter at the substation causes the opening of the circuit of the slow-acting relay 540 at the pallet switch 551 and the closure of a circuit, before the slow-acting relay 540 is deenergized, which extends from ground by way of auxiliary switch 551, armature 545 and its front contact, conductor 560, front contact and armature 618, armature 619 and its front contact, armature 639 and its back contact, and relay 607 to battery.

The relay 607 is energized to prepare a point in the circuit of the relay 606 at armature 636, and to complete a circuit that extends from ground by way of back contact and armature 635, armature 637 and its front contact, relay 608 and relay 607 to battery. The relay 608 is short-circuited until the circuit of the relay 607 is opened. When the slow-acting relay 540 is finally deenergized, the short-circuit is removed from the relay 608 and this relay is operated to place ground upon conductor 560 at armature 638. A starting circuit is prepared by the grounding of conductor 560.

The deenergization of the slow-acting relay 540 also connects ground to the previously traced signalling circuit that includes the relay 203 at the office. Upon operating, the relay 203 attracts its armature 230, whereby the armatures 227, 228 and 229 of the relay 202 are permitted to resume their normal position. By the operation of the armature 227, the signalling device 226 is extinguished and the signalling lamp 225 is lighted. The operation of the armature 228 completes a circuit for the relay 204, while the armature 229 opens one point in the circuit of the relay 200. By the change in signalling devices, the dispatcher is informed that the desired action at the substation has taken place.

The slow-release relay 204 is energized to open the circuit of the signalling relay 203 at armature 231, and to complete a circuit at armature 232 that extends from battery by way of said armature and its front contact, relay 201, and working contact of spring 220 and said spring to ground. The relay 201 is energized over this circuit and operates its armature 224 to permit the release of the armatures 222 and 223 of the relay 200. By the operation of the armature 223, the control circuit, including the relay 542 is opened, while, by the operation of the armature 222, a circuit is completed that extends from ground by way of spring 220 and its working contact, back contact and armature 222, switch 260, springs of key K—11, working contact of spring 253 and said spring, conductor 27, and relay 304 to battery. The relay 304 is energized to open the locking circuit of the relay 305 at armature 325 and the relay 305 is deenergized to complete the driving circuit.

The driving circuit now continues to function in the same manner as before. The line relays 311 and 314 are connected to this circuit alternately to cause the operation of the counting relays in the following sequence, 109, 108, 121, 120, 107, 106, 119, 118, 105, 104, 117, 116, 103, 102, 115, 114, 101, 100, 113 and 112. By the operation of the counting relays the selecting relays 213, 212, 211, 210, 209, 208, 207, 206 and 205 are operated in the sequence mentioned, each relay being released upon the energization of the next succeeding counting relay. That is, the selecting relay 214 is released by the energization of the counting relay 109. The selecting relays, in operating, prepare certain circuits for connecting the various keys, such as K—1, and signalling devices 225 and 226 to the driving circuit. Inasmuch as it has been assumed that the dispatcher desires only to operate the circuit interrupter C, no further control circuits will be completed and the action of the driving circuit to cause the operation of the relays just mentioned will be continued.

The operation of the selecting relays 209, 208, 207, 206 and 205 serves to connect conductors extending to keys similar to key K—1 so that the apparatus units in the distant station may be controlled in a manner that will be described hereinafter.

At the intermediate station, the line relays 610 and 613 are alternately connected to the driving circuit and operated to bring about the energization of the counting relays in the following sequence, 402, 403, 414, 415, 404, 405, 416, 417, 406, 407, 418, 419, 408, 409, 420, 421, 410, 411, 422 and 423. The operation of the counting relays causes the energization of the selecting relays in the following sequence, 501, 502, 503, 504, 505, 506, 507, 508 and 509. The selecting relays are deenergized in the same sequence by the operation of the next succeeding counting relay. That is, the selecting relay 500 is deenergized by the operation of the counting relay 413. The operation of the selecting relays connects various relays, such as 540 to 542, inclusive, to the signalling and control circuits so that the proper signals are transmitted to the dispatcher's office to apprise the dispatcher of the position of the various apparatus units.

The energization of the selecting relay 505 completes a circuit through the control line 31 from the dispatcher's office through the contact 516 of the selecting relay conductor 533 to the signal repeating relay 801. This relay latches itself and repeats an impulse to the remote station, as is described more in detail hereinafter.

It will be obvious that, in order to insure proper action of the driving circuit, it is necessary to alternately connect the line relays 311 and 314 and the line relays 610 and 613 to the driving circuit at the dispatcher's office and intermediate station, respectively. Otherwise, there is no driving circuit completed. The alternate connection of the line relays and the action of the driving circuit is controlled indirectly by the energization of the counting and selecting relays, it being necessary that the line relays 311 and 314 be operated to bring about the energization of a single counting relay, such as counting relay 111. In the same manner, it is necessary that the line relays 613 and 610 be operated to bring about the operation of the counting relay 400 at the substation.

The operation of the counting relays, such as 111 and 400, causes the operation of the relays 305 and 601 whereby the action of the driving circuit is interrupted. This operation effects the simultaneous energization of such selecting relays as are selected. The operation of these selecting relays, in turn, controls the operation of the relays 304 and 512 to close the driving circuit. By this interrelation of circuits, the synchronous action of the relay selecting apparatus is insured. This is true even though the control or driving circuit be subjected to inductive interference because, unless the line relays are properly connected to the driving circuit, there will be no selecting action.

When the counting relay 113 is operated by the energization of the line relay 314, the circuit of the selecting relay 205 is opened and a circuit is completed for the relay 112. The circuit for the relay 112 is not effective until the circuit of the relay 113 is opened. The relay 205 is deenergized to open certain signalling circuits and to remove ground from conductor 27 whereby the relay 304 is deenergized, to complete a circuit for the relay 305. The relay 305 is operated to open the circuit of the relay 314. This relay is deenergized to cause the operation of the relay 313. The relay 313 is operated to open the impulsing circuit, whereby the short-circuit is removed from the relay 112. Upon operating, the relay 112 opens the original energizing circuit of the relay 113 at armature 145, opens the circuit of the relay 126 at armature 143, and removes the short-circuit from the relay 125 at armature 144.

The relay 125 is now energized in series with all the counting relays. This relay operates to remove ground from conductor 23 at armature 185, and to complete a circuit for the slow-acting relay 124 at the front contact of this armature. By the removal of ground from conductor 23, the circuit of the relays 215 and 216 is opened and these relays are deenergized. The relay 215 is deenergized to open another point in the circuit of the relay 216 and to open another point in the circuit of the relay 304. The relay 216 is deenergized to prepare a circuit for the relay 215 at armature 256, to prepare a point in the circuit of the relay 304 at armature 257, to open a signalling circuit at armature 258, to open the control circuit at armature 259, and to prepare a holding circuit at the back contact of this armature.

The slow-acting relay 124 is energized to remove ground from conductor 25 at armature 183 and to place ground upon the conductor 24 at the front contact of this armature. In addition, the operation of the relay 124 serves to open the circuits of all the counting relays 100 to 123, inclusive, and also the circuit of the relay 125 at armature 182. The relay 125 is deenergized to open the circuit of the slow-acting relay 124, although this relay remains operated for a short interval of time.

The removal of ground from conductor 25 brings about the deenergization of the relay 305 and the relays 312 and 313. The relay 305 is deenergized to prepare one point in the driving circuit. The relays 312 and 313 are deenergized to restore certain circuits to normal. By the connection of ground to conductor 24, a circuit is completed for the relay 300. The relay 300 is energized to establish a locking circuit for itself at armature 316, to open the circuits of the relays 301 and 302 at armature 317, and to open the circuit of the relay 306 at armature 318. The relay 301 is deenergized to open one point in the circuit of the relay 302. The relay 302 is deenergized to prepare a point in the holding circuit at armature 321. The relay 306 is deenergized to open the driving circuit at armature 329 and to prepare a point in the starting circuit at armature 328. In this manner, the apparatus at the dispatcher's office is restored to normal.

At the intermediate station, the counting relay 422 is energized by the operation of the line relay 613. The relay 422 is operated to effect the closure of a circuit for the relay 423 and the opening of the circuit of the selecting relay 509. The relay 509 is deenergized to open the circuit of the relay 512. The relay 512 is deenergized to prepare a circuit for the relay 609. The relay 601 is energized to complete a circuit for the relay 609. The operation of the relays 601 and 609 connects the line relay 610 to the driving circuit so that this relay is energized in series with the line relay 314 at the dispatcher's office.

When the driving circuit is opened by the operation of the relay 305 in the manner described, the relay 610 is deenergized and the relay 611 is permitted to energize. As a result of this operation, the relay 616 is deenergized and the short-circuit is removed from the counting relay 423. Upon operating, the counting relay 423 opens the original energizing circuit of the relay 422 at armature 454, opens the circuit of the relay 424 at armature 453, and removes the short-circuit from the relay 425 at armature 453. The relay 425 is operated to remove ground from conductor 483 at armature 462 and to complete a circuit for the relay 426 at the front contact of this armature.

By the removal of ground from conductor 483, the circuit of the relays 510 and 511 is opened. The relay 511 is deenergized to open one point in the circuit of the relay 510. The relay 510 retracts its armatures to prepare one point in the circuit of the relay 511 at armature 519, to open one point in the signalling circuit at armature 520, to open one point in the control circuit at armature 521, and to prepare a point in the holding circuit at the back contact of this armature.

The slow-acting relay 426 is energized to open the circuits of all the counting relays 400 to 423, inclusive, and also to open the circuit of the relay 425. Various counting relays are deenergized to restore certain circuits to normal. The relay 425 is deenergized to open the circuit of the relay 426, which remains energized for a short interval of time. The removal of ground from conductor 485 brings about the deenergization of the relays 601 and 609 and the relays 611 and 612. These relays retract their armatures to restore certain circuits to normal.

By the connection of ground to conductor 484, a circuit is completed for the relay 603. The relay 603 is operated to open certain points in the circuit of the relays 604 and 605 at armature 629, to open the circuit of the relay 600 at armature 627, and to establish a locking circuit for itself at armature 628. The relay 604 is deenergized to open one point in the circuit of the relay 605 at armature 630 and to open one point in the circuit of the relay 606 at armature 631. The relay 605 is deenergized to prepare a circuit for the relay 604 at armature 632 and to prepare a holding circuit at armature 633.

The holding circuit is now completed over a path that extends from ground by way of back contact and armature 321, holding relay 303, conductor 26, back contact and armature 259, conductor 31, armature 521 and its back contact, conductor 530, armature 633 and its back contact, and holding relay 602 to battery.

The holding relay 303, at the dispatcher's office, is energized to open the locking circuit of the relay 300 and to prepare a circuit for the starting relay 301. The relay 300 is deenergized to prepare a circuit for the relay 302 at armature 317 and to prepare a circuit for the relay 306 at armature 318.

At the intermediate station, the holding relay 602 is energized to open the locking circuit of the relay 603 at armature 626, and to prepare a point in the circuit of the relay 606 at the front contact of this armature. The relay 603 is deenergized to prepare a circuit for the relay 605 at armature 629 and to prepare a circuit for the relay 600 at armature 627. In this manner, the apparatus at the intermediate station is restored to normal.

When the relay 602 is energized, there is a starting circuit completed that extends from ground upon grounded conductor 560 by way of front contact and armature 624, armature 619 and its back contact, armature 632 and its back contact, and relay 604 to battery. The relay 604 is energized to complete a circuit for the relay 605 at armature 630, and to complete a circuit, at armature 631, that extends from ground by way of armature 626 and its front contact, front contact and armature 631, relay 606, and front contact and armature 636 to battery. The relay 605 is not energized so long as the original circuit for the relay 604 is maintained.

The relay 606 is operated to open the circuits of the relays 607 and 608. The relay 607 is deenergized to open the circuit of the relay 606. The relay 605 is immediately energized in series with the relay 604. By the operation of the relay 605, the holding circuit is opened and the holding relays 303 and 602 at the dispatcher's office and intermediate station, respectively, are deenergized. The results of the deenergization of these relays are the same as those previously described and function to bring about the selecting operation of the relay apparatus. The purpose of this reoperation is to positively check all the supervisory indications of the dispatcher.

In the event that an apparatus unit at the intermediate station is operated automatically by the action of devices responsive to circuit conditions, the action of the selecting apparatus is immediately initiated. In order to describe this action, it will be assumed that the circuit interrupter C is closed and that it is opened by the action of automatic devices (not shown) or manually by an operator at the intermediate station. When the circuit interrupter is opened, there is a circuit completed for the slow-to-pick-up relay 540 by the auxiliary switch 551. Before the slow-to-operate relay 540 is energized, a circuit is completed that extends from ground by way of auxiliary switch 551, armature 546 and its back contact, conductor 560, front contact and armature 624, armature 619 and its back contact, armature 632 and its back contact, and relay 604 to battery. The relay 604 is energized to complete a circuit for the relay 605. When the slow-to-operate relay 540 is finally energized ground is removed from the conductor 560 with the result that the short-circuit of the relay 605 is removed and this relay is operated to open the holding circuit. By this operation, the selecting action is initiated.

Under certain conditions, it will be obvious that the dispatcher may find it desirable to connect with a certain apparatus unit in the intermediate station and remain in connection therewith while he observes its operation in response to the control. To accomplish this result, the dispatcher is provided with a number of keys, such as K—7 to K—11, inclusive. These keys are associated with the selecting relays 211 to 214, inclusive, that are operated whenever an apparatus unit in the intermediate station is selected. To describe this operation, it will be assumed that the dispatcher desires to observe the operation of the circuit interrupter C. In order to accomplish this result, the dispatcher will operate the key K—11 and will then operate the start key K—12.

The operation of the selecting apparatus proceeds as before and the selecting relays 214 and 500 at the dispatcher's office and intermediate station, respectively, are energized by the action of the driving circuit. Under these conditions, the relay 305 is locked energized and the circuit of the relay 304, which opens the locking circuit of the relay 305, is opened by the operation of the key K—11. Consequently, until this key is restored to normal, the apparatus will remain in this position by reason of the driving circuit being opened. Therefore, the dispatcher is able to operate the circuit interrupter C as often as he desires and observe its action by the operation of the supervisory devices 225 and 226.

When the dispatcher desires to have the selecting apparatus continue its selecting action, he will restore the key K—11 to normal, whereby the circuit for the relay 304 is permitted to be closed. As a result of this action, the relay 305 is deenergized to complete the driving circuit. The operation of the selecting apparatus proceeds in the same manner as before described.

The operation of the selecting apparatus will now be described when the dispatcher desires to operate to a closed position, an apparatus unit in the distant station, such as the circuit interrupter C—1. In order to bring about the operation of this apparatus unit, the dispatcher will operate the key K—1 in a direction opposite from that shown. The switch 260 will, of course, be thrown into a position opposite from that shown so as to associate the key K—1 with the selecting relay 209. The dispatcher will then operate th start key K—12. By this operation, the selecting action is initiated and the driving circuit is operated to control the operation of the counting selecting relays at the dispatcher's office and intermediate stations in the same manner as before described.

By the operation of the driving circuit, the selecting relays 214, 213, 212, 211, 210 and 209 are operated in the sequence mentioned. The action of the driving circuit is interrupted when the selecting relay 209 is operated by reason of the fact that there is no ground present upon the conductor extending from the working contact of spring 245 of the relay 209, the key K—1 having been operated into a position opposite from that shown.

At the intermediate station, the selecting relays 500, 501, 502, 503, 504 and 505 are operated in the sequence mentioned by the action of the counting relays 410, 411, 422, 423, 408, 409, 420, 421, 406 and 407. As before mentioned, the action of the driving circuit ceases with the selecting relay 209 at the dispatcher's office operated and with the selecting relay 505 at the intermediate station operated.

In order to control the operation of the interrupter C—1 at the distance station, the dispatcher will operate the main control key K. As a result of this operation, a circuit is completed that extends from ground by way of the springs of key K, working contact of spring 217 and said spring, working contact of spring 223 and said spring, switch 260 in a position opposite from that shown, working contact of spring 245 and said spring, front contact and armature 259, trunk conductor 31, armature 521 and its front contact, spring 516 and its working contact, conductor 533, armature 820 and its front contact, and relay 801 to battery.

The relay 801 is energized and, upon operating, opens the circuit of the slow-acting relay 800 at armature 823, completes a circuit that extends from ground by way of front contact and armature 822, armature 833 and its back contact, and relay 809 to battery, and at armature 821 completes a circuit that extends from ground by way of front contact and said armature, conductor 532, working contact of spring 517 and said spring, front contact and armature 520, trunk conductor 30, armature 258 and its front contact, spring 244 and its working contact, switch 260, armature 231 and its back contact, and relay 203 to battery.

The slow-acting relay 800 is deenergized after a short interval of time to open the circuit of the relay 801 and to prepare a circuit for the relay 802. The relay 809 is energized to attract the armature 836, thereby permitting the armatures 834, 835 and 837 of the relay 808 to restore to normal. As a result of the operation of the armature 834, the circuit of the relay 810 is opened, ground is removed from the conductor 952 extending to the working contact of spring 923 of the relay 909, and a circuit is completed at the back contact of this armature for the relay 807 and, at the same point, a circuit is prepared for the relay 811. The relay 807 is energized to open the circuit of the relay 809 and to prepare a circuit for the relay 808. The armatures 838 and 839 of the relay 810 remain in the position shown, after this relay is deenergized, by reason of the fact that the relay 811 is deenergized, and the armature 840 of the relay 811 maintains the armatures 838 and 839 in their operated position.

At the dispatcher's office, the relay 203 is energized to attract its armature 230, thereby permitting the armatures 227, 228 and 229 of the relay 202 to restore to normal. The operation of the armature 227 serves to open the circuit of the signalling lamp 226 and to complete a circuit for the signalling lamp 225. The change in supervisory signals at the dispatcher's office apprises the dispatcher of the fact that the proper circuit conditions are set up in the signal repeating relays to cause an operation of the circuit interrupter C—1 at the distant station.

The operation of the armature 228 completes a circuit for the relay 204. The relay 204 is energized to open the circuit of the relay 203 at armature 231, and to complete a circuit at armature 232 that extends from battery by way of said armature and its front contact, relay 201 and working contact of spring 220 of key K—1 and said spring to ground. The relay 201 is energized to operate its armature 224, thereby permitting the restoration of the armatures 222 and 223. The operation of the armature 223 serves to open the circuit of the relay 802 at the intermediate station and to prepare a circuit for the relay 801.

The operation of the spring 222 places ground upon a conductor which extends through the switch 260, working contact of spring 246 and said spring, conductor 27 and relay 304 to battery. The operation of the relay 304 serves to initiate the action of the driving circuit. The driving circuit is now operated in a manner described to control the operation of the counting and selecting relays in the first and second groups at the dispatcher's office and intermediate station. These operations all occur in substantially the same manner as previously described.

It will be remembered that, when the relay 600 is energized at the beginning of the selecting operation of the apparatus in the dispatcher's office and intermediate station, there is a circuit completed that extends from ground by way of front contact and armature 688, conductor 661, armature 825 and its back contact, and relay 804 to battery. The relay 804 is energized to complete a circuit for the relay 803 over a path that extends from ground by way of armature 1020 and its back contact, conductor 851, armature 827 and its front contact, relay 803 and relay 804 to battery. The relay 803 is not energized so long as the original circuit for the relay 804 is completed.

When the selecting operation of the selecting apparatus in the dispatcher's office and intermediate station is completed, the holding relay at the intermediate station 602 is energized to open the circuit of the relay 600. The relay 600 is deenergized to open the circuit of the relay 804. By this operation, the short-circuit is removed from the relay 803 and this relay is energized to open another point in the original energizing circuit of the relay 804 and to complete a circuit extending from ground by way of front contact and armature 826, conductor 852, back contact and armature 1030, armature 1025 and its front contact, armature 1021 and its back contact and relay 1001 to battery.

The relay 1001 is energized to complete a circuit that extends from ground by way of back contact and armature 1017, armature 1019 and its front contact, relay 1002 and relay 1001 to battery. The relay 1002 is not energized until the original circuit of the relay 1001 is opened. Another result of the operation of the relay 1001 is that the circuits of the relays 803 and 804 are opened. These relays are restored to normal with the result that the original circuit of the relay 1001 is opened. This operation serves to remove the short-circuit from the relay 1002 and the relay 1002 is energized to open the second holding circuit extending from the intermediate station to the distant station. The results of this operation will be described subsequently.

There is a holding circuit completed for maintaining the selective apparatus in the intermediate and distant stations in its normal condition. This circuit extends from ground by way of back contact and armature 1022, relay 1033, conductor 953, back contact and armature 935, conductor 956, armature 1153 and its back contact, conductor 1163, armature 1235 and its back contact, and holding relay 1202 to battery. The holding relay 1003 at the intermediate station is energized to open one point in the locking circuit of the relay 1000 at armature 1024, to prepare a starting circuit at armature 1025, and to open one point in the circuit of the relay 1006 at armature 1026.

At the distant station, the holding relay 1202 is energized to prepare one point in the starting circuit at armature 1226, to establish one point in the circuit of the relay 1200 at armature 1227, to open one point in the locking circuit of the relay 1203 at armature 1228, and to prepare one point in the circuit of the relay 1206 at the front contact of this armature. When this holding circuit is opened by the operation of the relay 1002, as above described, the holding relay 1003 at the intermediate station and the holding relay 1202 at the distant station are deenergized.

Upon being deenergized, the relay 1003 completes a circuit for the relay 1006 at armature 1026, opens an additional point in the starting circuit at armature 1025, and at armature 1024 prepares a locking circuit for the relay 1000. The relay 1006 is operated to open a further point in the starting circuit at armature 1030, and to prepare one point in the driving circuit at armature 1031.

At the distant station, the relay 1202 is deenergized to open one point in the starting circuit at armature 1226, to complete a circuit for the relay 1200 at armature 1227, and to prepare a locking circuit for the relay 1203 at armature 1228. The relay 1200 is operated to complete another point in the driving circuit and to prepare another starting circuit at armatures 1220 and 1221.

The driving circuit is now closed over a path that extends from battery by way of back contact and armature 1040, line relay 1011, back contact and armature 1052, back contact and armature 1029, armature 1031 and its front contact, trunk conductor 1060, front contact and armature 1222, armature 1224 and its back contact, back contact and armature 1241, line relay 1213, and armature 1254 and its back contact to ground.

The line relay 1011 is operated to complete a circuit for the relay 1008 at armature 1042 and to complete a circuit for the relay 1009 at armature 1043. The relay 1009 is energized to open one point in the locking circuit of the relays 1012 and 1013 at armature 1037, and to complete a circuit for the relay 1010 at armature 1038 over a path that extends from ground by way of armature 768 and its back contact, conductor 799, armature 1044 and its back contact, armature 1038 and its front contact, relay 1010 and relay 1009 to battery. This circuit is not operative to cause the energization of the relay 1010 until the short-circuit is removed therefrom by the deenergization of the relay 1011. The relay 1008 is operated to open one point in the locking circuit of the relay 1007 at armature 1036, and to establish a locking circuit for itself at armature 1035 to ground upon grounded conductor 799. At the distant station, the line relay 1213 is operated to complete a circuit for the relay 1216 at armature 1251, and to complete a circuit for the relay 1215 at armature 1252. The relay 1215 is operated to open one point in the circuit of the relays 1211 and 1212 at armature 1255, and to complete a circuit for the relay 1214 at armature 1256 over a path that extends from ground by way of armature 1364 and its back contact, conductor 1166, armature 1249 and its back contact, armature 1256 and its front contact, relay 1214 and relay 1215 to battery. This circuit does not operate to energize the relay 1214 until the short-circuit is removed from this relay by the deenergization of the relay 1213.

The relay 1216 is operated to open one point in the locking circuit of the relay 1217 at armature 1258, to establish a locking circuit for itself at armature 1257, to ground upon grounded conductor 1166, and to complete a circuit at armature 1259 that may be traced from ground by way of said armature and its front contact, conductor 1165, armature 1360 and its back contact, armature 1331 and its back contact, counting relay 1300, back contact and armature 1354, and back contact and armature 1361 to battery.

The counting relay 1300 is energized over this circuit and operates to complete a circuit at armature 1327 which extends from ground by way of armature 1363 and its back contact, armature 1327 and its front contact, relay 1301, relay 1300, back contact and armature 1354, and back contact and armature 1361 to battery, and to complete a circuit at armature 1328 that may be traced from ground by way of said armature and its front contact, armature 1333 and its back contact, conductor 1168, and relay 1201 to battery.

The relay 1201 is energized to establish a locking circuit for itself at armature 1223, to open the driving circuit including the line relays 1011 and 1213 at armature 1224, to connect the driving circuit to the armature 1242 of the relay 1209 at the front contact of this armature, and to complete a circuit for the relay 1209 at armature 1225. The locking circuit of the relay 1201 extends from ground upon grounded conductor 1166 by way of back contact and armature 1245, armature 1223 and its front contact, and relay 1201 to battery.

The circuit for the relay 1209 may be traced from ground by way of back contact and armature 1150, conductor 1162, armature 1225 and its front contact, and relay 1209 to battery. The relay 1209 is operated to open an additional point in the circuit of the line relay 1213 at armature 1241, to establish a locking circuit for itself at armature 1243, and to prepare a circuit for the line relay 1210 at armature 1242. It will be obvious that, by the operation of the relays 1201 and 1209, the circuit of the line relays 1011 and 1213 is opened. The relay 1213 is deenergized to remove the short-circuit from the relay 1214. The relay 1214 operates to open another point in the circuit of the relay 1213.

At the intermediate station, the relay 1011 is de-energized to remove the short-circuit from the relay 1010. The relay 1010 is operated to open another point in the original circuit of the relay 1011 at armature 1040, to open another point in the circuit of the relay 1009 at armature 1039, and to complete a circuit at armature 1041 for the relay 1015. The relay 1015 is energized to establish a locking circuit for itself at armature 1053, to disconnect the line relay 1011 from the driving circuit at armature 1052, and to connect the driving circuit to the relay 1014 at the front contact of this armature.

The driving circuit now extends from ground by way of back contact and armature 1047, line relay 1014, front contact and armature 1052, back contact and armature 1029, armature 1031 and its front contact, trunk conductor 1060, front contact and armature 1222, armature 1224 and its front contact, armature 1242 and its front contact, line relay 1210, and armature 1248 and its back contact to battery. The line relays 1014 and 1210 are energized over this circuit.

The line relay 1014 is operated to complete a circuit for the relay 1012 at armature 1051 and to complete a circuit for the relay 1007 at armature 1050. The relay 1012 is operated to open the circuits of the relays 1009 and 1010 at armature 1044, and to prepare a circuit for the relay 1013 at armature 1045. The relay 1010 is deenergized to prepare a circuit for the relay 1009 at armature 1039, to prepare a circuit for the line relay 1011 at armature 1040, and to open the original energizing circuit of the relay 1015 at armature 1041. The relay 1009 is deenergized to open another point in the circuit of the relay 1010 at armature 1038, and to complete a circuit that extends from ground upon grounded conductor 799, back contact and armature 1037, armature 1045 and its front contact, relay 1013 and relay 1012 to battery. The relay 1013 is short-circuited so long as the relay 1014 is energized and, consequently, the relay 1013 is not energized.

The relay 1007 is operated to prepare a locking circuit for itself at armature 1033, to open the locking circuit of the relay 1008 at armature 1032, and to complete an impulsing circuit at armature 1034. The relay 1008 is deenergized to complete a locking circuit for the relay 1007 to ground upon grounded conductor 799.

The impulsing circuit just mentioned extends from ground by way of back contact and armature 1049, armature 1034 and its front contact, conductor 796, armature 771 and its back contact, armature 743 and its back contact, counting relay 712, back contact and armature 750, and back contact and armature 769 to battery.

The counting relay 712 is energized over this circuit and operates to complete a circuit at armature 746 which extends from ground by way of armature 767 and its back contact, armature 746 and its front contact, relay 711, relay 712, back contact and armature 750, back contact and armature 769 to battery, and to complete a circuit at armature 747 that extends from ground by way of said armature and its front contact, armature 745 and its back contact, conductor 785, relay 1005, and armature 1027 and its back contact to battery. The relay 1005 is energized to establish a locking circuit for itself at armature 1028, to open the driving circuit, including the relays 1014 and 1210, at armature 1029. As a result of this operation, the line relays mentioned are deenergized.

When the driving circuit is opened, the relay 1014 is deenergized, as before mentioned. Upon being deenergized, the relay 1014 opens one point in the original energizing circuit for the relay 1007 at armature 1050, and at armature 1051 removes the short-circuit from the relay 1013. The relay 1013 is immediately operated to open another point in the original circuit for the relay 1012 at armature 1046, to open another point in the circuit of the relay 1014 at armature 1047, to open the locking circuit of the relay 1015 at armature 1048, and to open an impulsing circuit at armature 1049. The relay 1015 is deenergized to disconnect the line relay 1014 from the driving circuit and to connect the line relay 1011 thereto at armature 1052.

When the impulsing circuit is opened, the short-circuit is removed from the counting relay 711 and this relay is permitted to operate. Upon operating, the relay 711 opens another point in the original energizing circuit of the relay 712 at armature 743, prepares a circuit for the counting relay 723 at armature 742, removes ground from the conductor 785 at armature 745, completes a circuit at armature 741 that extends from ground by way of back contact and armature 761, armature 741 and its front contact, and relay 726 to battery, and at armature 744 completes a circuit that extends from ground by way of armature 769 and its back contact, armature 766 and its back contact, armature 744 and its front contact, conductor 795, armature 932 and its back contact, and relay 910 to battery.

The relay 910 is energized to complete a circuit that extends from ground by way of armature 770 and its back contact, conductor 797, armature 930 and its front contact, relay 911 and relay 910 to battery, and at armature 931 completes a circuit that extends from ground by way of said armature and its front contact, back contact and armature 933, conductor 954, and relay 1004 to battery. The relay 911 is short-circuited so long as the original energizing circuit of the relay 910 is completed.

The relay 1004 is energized to open the locking circuit of the relay 1005 which is deenergized. The relay 1005 retracts the armature 1029 to prepare one point in the driving circuit.

At the distant station, the line relay 1210 is deenergized by the opening of the driving circuit to remove the short-circuit from the relay 1211. As a result of this operation, the relay 1211 is operated to open the locking circuit of the relays 1209 and 1201 at armature 1245, to complete a circuit for the relay 1217 at armature 1246, to open an additional point in the original circuit of the relay 1212 at armature 1247, and to open an additional point in the original circuit of the line relay 1210 at armature 1248.

The relay 1217 is energized to open the locking circuit of the relay 1216 at armature 1260, and to prepare a locking circuit for itself at armature 1261. The relay 1216 is deenergized to complete a locking circuit for the relay 1217 at armature 1258, and to open the impulsing circuit at armature 1259. By the opening of the impulsing circuit, the short-circuit is removed from the counting relay 1301 and this relay is energized.

Upon operating, the relay 1301 opens one point in the original energizing circuit of the relay 1300 at armature 1331, prepares a circuit for the counting relay 1312 at armature 1330, completes a circuit at armature 1329 that extends from ground by way of back contact and armature 1343, armature 1329 and its front contact and relay 1324 to battery, removes ground from conductor 1168 at armature 1333 and at armature 1332 completes a circuit that extends from ground by way of armature 1341 and its back contact, armature 1332 and its front contact, conductor 1181, armature 1151 and its back contact, and relay 1127 to battery. The relay 1324 is energized to prepare another point in the circuit of the counting relay 1312.

By the removal of ground from conductor 1168, the relay 1201 is deenergized to open the original circuit of the relay 1209 at armature 1225. Another result of the deenergization of the relay 1201 is that the driving circuit is connected to the back contact of armature 1241 of relay 1209 at armature 1224. The relay 1209 is deenergized to connect the line relay 1213 to the driving circuit and to open another point in the circuit of the relay 1210 at armature 1242.

The relay 1127 is energized to complete a circuit that extends from ground by way of armature 1362 and its back contact, conductor 1165, armature 1154 and its front contact, relay 1126 and relay 1127 to battery. This circuit is not effective so long as the original circuit for the relay is maintained.

By the deenergization of the relays 1201 and 1209, the driving circuit is completed. This driving circuit extends from battery by way of back contact and armature 1040, relay 1011, back contact and armature 1052, back contact and armature 1029, armature 1031 and its front contact, conductor 1060, front contact and armature 1222, armature 1224 and its back contact, back contact and armature 1241, line relay 1213, and armature 1254 and its back contact to ground. The line relays 1011 and 1213 are energized over this circuit.

The line relay 1011 is operated to complete a circuit for the relay 1008 at armature 1042, and to complete a circuit for the relay 1009 at armature 1043. The relay 1009 is energized to open the circuits of the relays 1012 and 1013 at armature 1037, and to prepare a circuit for the relay 1010 at armature 1038. The relay 1013 is deenergized to prepare a circuit for the relay 1012 at armature 1046, to prepare a circuit for the line relay 1014 at armature 1047, to close one point in the locking circuit of the relay 1015 at armature 1048, and to close one point in the impulsing circuit at armature 1049. The relay 1012 is deenergized to open one point in the circuit of the relay 1013 at armature 1045, and to complete the circuit of the relay 1010 at armature 1044. The relay 1010 is not energized so long as the original circuit of the relay 1009 is maintained. The relay 1008 is operated to open the locking circuit of the relay 1007 at armature 1036, and to prepare a locking circuit for itself at armature 1035. The relay 1007 is deenergized to complete the locking circuit of the relay 1008 and to open another point in the impulsing circuit at armature 1034.

At the distant station, the relay 1213 is energized to complete a circuit for the relay 1216 at armature 1251, and to complete a circuit for the relay 1215 at armature 1252. The relay 1215 is operated to open the circuit of the relays 1211 and 1212 and to prepare a circuit for the relay 1214 at armature 1256. The relay 1211 is deenergized to prepare a circuit for the relay 1210 at armature 1248, to prepare a circuit for the relay 1212 at armature 1247, to open the original energizing circuit of the relay 1217 at armature 1246, and to prepare a locking circuit for the relays 1201 and 1209 at armature 1245.

The relay 1216 is energized to prepare a locking circuit for itself at armature 1257, to open the locking circuit of the relay 1217 at armature 1258, and to complete an impulsing circuit at armature 1259. The relay 1217 is deenergized to close the locking circuit of the relay 1216.

The impulsing circuit just mentioned extends from ground by way of armature 1259 and its front contact, conductor 1165, armature 1360 and its front contact, front contact and armature 1330, armature 1345 and its back contact, counting relay 1312, back contact and armature 1354, and back contact and armature 1361 to battery.

The counting relay 1312 is energized over this circuit and operates to open the circuit of the relay 1127 at armature 1341, to complete a circuit at the front contact of this armature that extends from ground by way of armature 1363 and its back contact, armature 1341 and its front contact, relay 1313, relay 1312, back contact and armature 1354, and back contact and armature 1361 to battery, and at armature 1340 completes a circuit that extends from ground by way of said armature and its front contact, armature 1342 and its back contact, conductor 1168, and relay 1201 to battery. The circuit for the relay 1313 is not effective to energize this relay until the original circuit of the relay 1312 is opened. The relay 1201 is energized to open the driving circuit including the line relays 1011 and 1213 at armature 1224, to complete a locking circuit for itself at armature 1223, and to complete a circuit for the relay 1209 at armature 1225. The relay 1209 is energized to establish a locking circuit for itself at armature 1243 and to prepare the driving circuit by connecting the relay 1210 thereto at armature 1242.

By the opening of the driving circuit, the line relay 1213 is deenergized to remove the short-circuit from the relay 1214. The relay 1214 is energized to open another point in the circuit of the relay 1115 and to open another point in the circuit of the relay 1113.

As before mentioned, the operation of the relay 1312 opens the original circuit for the relay 1127. This operation causes the removal of the short-circuit from the relay 1126. This relay is operated to prepare signalling and control circuits at armatures 1152 and 1153, respectively.

At the intermediate station, when the driving circuit is opened, the relay 1011 is deenergized to remove the short-circuit from the relay 1010. The relay 1010 operates to open one point in the original circuit for the relay 1009 at armature 1039, to open another point in the circuit of the line relay 1011 at armature 1040, and to complete a circuit for the relay 1015 at armature 1041. The relay 1015 is energized to connect the line relay 1014 to the driving circuit at armature 1052, and to establish a locking circuit for itself at armature 1053. The driving circuit, including the line relays 1014 and 1210 in series, is now completed.

The line relay 1014 is energized to complete a circuit for the relay 1012 and for the relay 1007. The relay 1012 is operated to open the circuit of the relays 1009 and 1010 at armature 1044 and to prepare a circuit for the relay 1013 at armature 1045. The relay 1010 is deenergized to prepare circuits for the relays 1011 and 1009 at armatures 1040 and 1039, and to open the original energizing circuit of the relay 1015 at armature 1041. The relay 1009 is deenergized to complete a circuit for the relay 1013. This latter operation is ineffective until the short-circuit is removed from the relay 1012 by the deenergization of the relay 1014.

The relay 1007 is operated to prepare a locking circuit for itself at armature 1033, to open the locking circuit of the relay 1008 at armature 1032, and to complete an impulsing circuit at armature 1034. The relay 1008 is deenergized to complete the locking circuit of the relay 1007.

The impulsing circuit extends from ground by way of back contact and armature 1049, armature 1034 and its front contact, conductor 796, armature 771 and its front contact, front contact and armature 742, armature 763 and its back contact, counting relay 723, back contact and armature 750, and back contact and armature 769 to battery.

The counting relay 723 is energized over this circuit and operates to open the circuit of the relay 910 at armature 766, to complete a circuit for the relay 722 at the front contact of this armature over a path that may be traced from ground by way of armature 767 and its back contact, armature 766 and its front contact, relay 722, relay 723, back contact and armature 750, and back contact and armature 769 to battery, and to complete a circuit at armature 765 that extends from ground by way of said armature and its front contact, armature 760 and its back contact, conductor 785, relay 1005, and armature 1027 and its back contact to battery. The counting relay 722 is not operated over this circuit by reason of the fact that it is shunted so long as the original circuit of the relay 723 is maintained.

By the removal of ground from conductor 794, the original circuit for the relay 910 is opened with the consequence that the short-circuit is removed from the relay 911. The relay 911, upon operating, opens an additional point in the original circuit of the relay 1003 at armature 935, opens the circuit of the relay 1004 at armature 933, and connects the signalling and controlling conductors 956 and 957, at armatures 934 and 935, to the contacts of the selecting relays.

The relay 1004 is deenergized to complete a circuit for the relay 1005, previously traced. The relay 1005 is energized to establish a locking circuit for itself at armature 1028 and to open the driving circuit, including the line relays 1014 and 1210, at armature 1024. The line relay 1014 is immediately deenergized to open the original energizing circuit of the relay 1007 and to remove the short-circuit from the relay 1013. The relay 1013 is energized to open another point in the original circuit of the relay 1012 at armature 1046, to open another point in the circuit of the relay 1014 at armature 1047, to open the locking circuit of the relay 1015 at armature 1048, and to remove ground from the impulsing circuit at armature 1049. The relay 1015 is deenergized to connect the line relay 1011 to the driving circuit.

By the opening of the impulsing circuit, the short-circuit is removed from the relay 722 and this relay is permitted to operate. Upon being energized, the relay 722 removes ground from conductor 785 at armature 760, opens the circuit of the relay 726 at armature 761, prepares a circuit for the counting relay 710 at armature 762, and at armature 764 completes a circuit that extends from ground by way of armature 767 and its back contact, armature 740 and its back contact, armature 764 and its front contact, conductor 794, and selecting relay 909 to battery. The relay 726 is deenergized to prepare a point in the circuit of the counting relay 710 at armature 771 and its back contact.

The removal of ground from conductor 785 causes the opening of the original energizing circuit of the relay 1005. This relay is not deenergized, however, by reason of the fact that its locking circuit remains closed.

The selecting relay 909 is operated to prepare a signalling circuit at spring 921, to prepare a control circuit at spring 922, and to prepare a point in the circuit of the relay 1004 at spring 923. The circuit of the relay 1004 is not completed by reason of the fact that there is no ground present upon the conductor 952, the ground potential having been removed from this conductor by the operation of the relay 808 in a manner described hereinbefore.

At the distant station, the line relay 1210 is deenergized, when the driving circuit is opened, to remove the short-circuit from the relay 1211. The relay 1211 is operated to open another point in the original circuit of the relay 1212 at armature 1247, to open a second point in the circuit of the line relay 1210 at armature 1248, to complete a circuit for the relay 1217 at armature 1246, and to open the locking circuits of the relays 1201 and 1209 at armature 1245.

The relay 1217 is energized to open the locking circuit of the relay 1216 at armature 1260, and to prepare a locking circuit for itself at armature 1261. The relay 1216 is deenergized to complete the locking circuit of the relay 1217 at armature 1258, and to open the impulsing circuit at armature 1259. By the latter operation, the short-circuit is removed from the counting relay 1313 and this relay is permitted to operate.

Upon being energized, the relay 1313 removes ground from conductor 1168 at armature 1342, opens the circuit of the relay 1324 at armature 1343, prepares a circuit for the counting relay 1302 at armature 1344, opens another point in the original circuit of the relay 1312 at armature 1345, and at armature 1346 completes a circuit that extends from ground by way of armature 1363 and its back contact, armature 1370 and its back contact, armature 1346 and its front contact, conductor 1180, and selecting relay 1115 to battery. The selecting relay 1115 is energized to prepare a signalling circuit at spring 1131, to prepare a control circuit at spring 1130, and to complete a circuit at spring 1132 for the relay 1125. The relay 1324 is deenergized to prepare another point in the circuit of the relay 1302.

The removal of ground from conductor 1168 brings about the deenergization of the relay 1201. The relay 1201 operates to prepare a circuit for the line relay 1213 and to open the circuit of the relay 1209. The relay 1209 is deenergized to open another point in the circuit of the line relay 1210 and to prepare another point in the circuit of the line relay 1213. The relay 1125 is energized to open another point in the circuit of the relay 1209.

The operation of the driving circuit is not completed by reason of the fact that the relay 1005 is locked energized. A control circuit is now completed that extends from ground by way of armature 835 and its back contact, front contact and armature 839, conductor 951, working contact of spring 922 and said spring, front contact and armature 935, trunk conductor 956, armature 1153 and its front contact, spring 1130 and its working contact, armature 1107 and its front contact, and relay 1102 to battery The relay 1102 is energized to complete a circuit for the closing coil 1103 of the circuit breaker C—1. The closing coil 1103 brings about the closing of the circuit interrupter in a well known manner.

Simultaneously with the completion of this control circuit, there is a signalling circuit completed that extends from battery by way of front contact and armature 1108, working contact of spring 1131 and said spring, front contact and armature 1152, conductor 957, armature 934 and its front contact, spring 921 and its working contact, conductor 950, armature 844 and its back contact and relay 813 to battery.

Inasmuch as the relays are in the proper position, this circuit is not effective at the present time. The action of the circuit interrupter C—1 at the distant station causes the opening of the circuit of the slow-acting relay 1100 at the pallet switch 1111 and the closure of a circuit, before the slow-acting relay is deenergized, which extends from ground by way of auxiliary switch 1111, armature 1105 and its front contact, conductor 1160, front contact and armature 1220, armature 1221 and its front contact, armature 1240 and its back contact, and relay 1207 to battery.

The relay 1207 is energized to prepare a point in the circuit of the relay 1206 at armature 1237, and to complete a circuit that extends from ground by way of back contact and armature 1236, armature 1238 and its front contact, relay 1208 and relay 1207 to battery. The relay 1208 is short-circuited until the circuit of the relay 1207 is opened. When the slow-acting relay 1100 is finally deenergized, the short-circuit is removed from the relay 1208 and this relay is operated to place ground upon conductor 1160. By the grounding of conductor 1160, a starting circuit is prepared.

The deenergization of the slow-acting relay 1100 also connects ground to the previously traced signalling circuit that includes the relay 813 at the intermediate station. Upon operating, the relay 813 attracts its armature 843, whereby the armatures 841 and 842 of the relay 812 are permitted to resume their normal position. The operation of the armature 841 completes a circuit for the slow-release relay 814, while the armature 842 opens one point in the circuit of the relay 810.

The slow-acting relay 814 is energized to open the circuit of the signalling relay 813 at armature 844, and to complete a circuit at armature 845 that extends from battery by way of said armature and its front contact, relay 811, and resting contact of spring 834 and said spring to ground. The relay 811 is energized over this circuit and operates its armature 840 to permit the release of the armatures 838 and 839 of the relay 810. By the operation of the armature 839, the control circuit, including the relay 1102, is opened, while, by the operation of the armature 838, a circuit is completed that extends from ground by way of armature 834 and its back contact, back contact and armature 838, conductor 952, working contact of spring 923 and said spring, conductor 954, and relay 1004 to battery. The relay 1004 is energized to open the locking circuit of the relay 1005 at armature 1027 and the relay 1005 is deenergized to complete the driving circuit.

The driving circuit now continues to function in the same manner as before. The line relays 1011 and 1014 are connected to this circuit alternately to cause the operation of the counting relays in the following sequence. 710, 709, 721, 720, 708, 707, 719, 718, 706, 705, 717, 716, 704, 703, 715, 714, 702, 701, 713 and 712. By the operation of the counting relays, the selecting relays 908, 907, 906, 905, 904, 903, 902, 901 and 900 are operated in the sequence mentioned, each relay being released upon the energization of the next succeeding counting relay. That is, the selecting relay 909 is released by the operation of the counting relay 710. The selecting relays, in operating, prepare certain circuits for connecting the various signal-repeating relays, such as the relays 801, 802 and 807 to 814, inclusive, to the signalling and control circuits. Inasmuch as it has been assumed that the dispatcher desires only to operate the circuit interrupter C—1, and, consequently, the signal-repeating relays, such as 801, 802 and 807 to 814, inclusive, are the only ones that have been operated, no further control circuits will be completed, and the action of the driving circuit to cause the operation of the relays just mentioned will be continued.

At the distant station, the line relays 1213 and 1210 are alternately connected to the driving circuit and operated to bring about the energization of the counting relays in the following sequence, 1302, 1303, 1414, 1415, 1304, 1305, 1416, 1417, 1306, 1307, 1418, 1419, 1308, 1309, 1420, 1421, 1310, 1311, 1422 and 1423. The operation of the counting relays causes the energization of the selecting relays in the following sequence, 1116, 1117, 1118, 1119, 1120, 1121, 1122, 1123 and 1124. The selecting relays are deenergized in the same sequence by the operation of the next succeeding counting relay. That is, the selecting relay 1115 is deenergized by the operation of the counting relay 1302. The operation of the selecting relays connects various relays, such as 1100 to 1102, inclusive, to the signalling and control circuits so that the proper signals are transmitted to the dispatcher's office by way of the intermediate station to apprise the dispatcher of the position of the various apparatus units in the distant station.

It will be obvious that, in order to insure proper action of the driving circuit, it is necessary to alternately connect the line relays 1011 and 1014, and the line relays 1213 and 1210 to the driving circuit at the intermediate and distant stations. Otherwise, there is no driving circuit completed. The alternate connection of the line relays and the action of the driving circuit is controlled indirectly by the energization of the counting and selecting relays, it being necessary that the line relays 1011 and 1014 be operated to bring about the energization of a single counting relay, such as counting relay 711. In the same manner, it is necessary that the line relays 1213 and 1210 be operated to bring about the operation of the counting relay 1301 at the distant station.

The operation of the counting relays, such as 711 and 1301, causes the operation of the relays 1005 and 1201 whereby the action of the driving circuit is interrupted. This operation brings about the simultaneous energization of whatever selecting relays are selected. The operation of these selecting relays, in turn, controls the operation of the relays 1004 and 1125 to close the driving circuit. By this interrelation of circuits, the synchronous action of the relay selecting apparatus is insured. This is true even though the control or driving circuit be subjected to inductive interference because, unless the line relays are properly connected to the driving circuit, there will be no selecting action.

When the counting relay 713 is operated by the energization of the line relay 1014, the circuit of the selecting relay 900 is opened and a circuit is completed for the relay 712. The circuit for the relay 712 is not effective until the original circuit of the relay 713 is opened. The relay 900 is deenergized to open certain signalling circuits and to remove ground from conductor 954, whereby the relay 1004 is deenergized, to complete a circuit for the relay 1005. The relay 1005 is operated to open the circuit of the line relay 1014. This relay is deenergized to cause the operation of the relay 1013. The relay 1013 is operated to open the impulsing circuit, whereby the short-circuit is removed from the relay 712. Upon operating, the relay 712 opens the original energizing circuit of the relay 1005 at armature 748, opens the circuit of the relay 726 at armature 749, and removes the short-circuit from the relay 725 at armature 750.

The relay 725 is now energized in series with all the counting relays. This relay operates to remove ground from conductor 797 at armature 770, and to complete a circuit for the slow-acting relay 724 at the front contact of this armature. By the removal of ground from conductor 797, the circuit of the relays 910 and 911 is opened and these relays are deenergized. The relay 910 is deenergized to open another point in the circuit of the relay 911 and to open another point in the circuit of the relay 1004. The relay 911 is deenergized to prepare a circuit for the relay 910 at armature 932, to prepare a point in the circuit of the relay 1004 at armature 933, to open a signalling circuit at armature 934, to open the control circuit at armature 935, and to prepare a holding circuit at the back contact of this armature.

The slow-acting relay 724 is energized to remove ground from conductor 799 at armature 768 and to place ground upon the conductor 798 at the front contact of this armature. In addition, the operation of the relay 724 serves to open the circuits of all the counting relays 700 to 723, inclusive, and also the circuit of the relay 725 at armature 767. The relay 725 is deenergized to open the circuit of the slow-acting relay 724, although this relay remains operated for a short interval of time.

The removal of ground from conductor 799 effects the deenergization of the relay 1005 and the relays 1012 and 1013. The relay 1005 is deenergized to prepare one point in the driving circuit. The relays 1012 and 1013 are deenergized to restore certain circuits to normal. By the connection of ground to conductor 798, a circuit is completed for the relay 1000. The relay 1000 is energized to establish a locking circuit for itself at armature 1016, to open the circuits of the relays 1001 and 1002 at armature 1017, and to open the circuit of the relay 1006 at armature 1018. The relay 1001 is deenergized to open one point in the circuit of the relay 1002. The relay 1002 is deenergized to prepare a point in the holding circuit at armature 1022. The relay 1006 is deenergized to open the driving circuit at armature 1031 and to prepare a point in the starting circuit at armature 1030. In this manner, the apparatus at the intermediate station is restored to normal.

At the distant station, the counting relay 1322 is energized by the operation of the line relay 1210. The relay 1322 is operated to bring about the energization of the relay 1201 and the opening of the circuit of the selecting relay 1124. The relay 1124 is deenergized to open the circuit of the relay 1125. The relay 1125 is deenergized to prepare a circuit for the relay 1209. The relay 1201 is energized to complete a circuit for the relay 1209. The operation of the relays 1201 and 1209 connects the line relay 1210 to the driving circuit so that this relay is energized in series with the line relay 1014 at the intermediate station.

When the driving circuit is opened by the operation of the relay 1005 in the manner described, the relay 1211 is permitted to energize. As a result of this operation, the relay 1217 is energized and the short-circuit is removed from the counting relay 1323. Upon operating, the counting relay 1323 opens the original energizing circuit of the relay 1201 at armature 1352, opens the circuit of the relay 1324 at armature 1353, and removes the short-circuit from the relay 1325 at armature 1354. The relay 1325 is operated to remove ground from conductor 1167 at armature 1362 and to complete a circuit for the relay 1326 at the front contact of this armature.

By the removal of ground from conductor 1167, the circuits of the relays 1126 and 1127 are opened. The relay 1127 is deenergized to open one point in the circuit of the relay 1126. The relay 1126 retracts its armatures to prepare one point in the circuit of the relay 1127 at armature 1151, to open one point in the signalling circuit at armature 1152, to open one point in the control circuit at armature 1153, and to prepare a point in the holding circuit at the back contact of this armature.

The slow-acting relay 1326 is energized to open the circuits of all the counting relays 1300 to 1323, inclusive, and also to open the circuit of the relay 1325. Various counting relays are deenergized to restore certain circuits to normal. The relay 1325 is deenergized to open the circuit of the relay 1326, which remains energized for a short interval of time. The removal of ground from conductor 1165 brings about the deenergization of the relays 1211 and 1212. These relays retract their armatures to restore certain circuits to normal.

By the connection of ground to conductor 1164, a circuit is completed for the relay 1203. The relay 1203 is operated to open certain points in the circuits of the relays 1204 and 1205 at armature 1231, to open the circuit of the relay 1200 at armature 1229, and to establish a locking circuit for itself at armature 1230. The relay 1204 is deenergized to open one point in the circuit of the relay 1205 at armature 1232, and to open one point in the circuit of the relay 1206 at armature 1233. The relay 1205 is deenergized to prepare a circuit for the relay 1204 at armature 1234, and to prepare a holding circuit at armature 1235.

The holding circuit is now completed over a path that extends from ground by way of back contact and armature 1022, holding relay 1003, conductor 953, back contact and armature 935, conductor 957, armature 1153 and its back contact, conductor 1163, armature 1235 and its back contact, and holding relay 1202 to battery.

The holding relay 1003, at the intermediate station, is energized to open the locking circuit of the relay 1000 and to prepare a circuit for the starting relay 1001. The relay 1000 is deenergized to prepare a circuit for the relay 1002 at armature 1017 and to prepare a circuit for the relay 1006 at armature 1018.

At the distant station, the holding relay 1202 is energized to open the locking circuit of the relay 1203 at armature 1228, and to prepare a point in the circuit of the relay 1206 at the front contact of this armature. The relay 1203 is deenergized to prepare a circuit for the relay 1205 at armature 1231, and to prepare a circuit for the relay 1200 at armature 1229. In this manner, the apparatus at the distant station is restored to normal.

When the relay 1200 is deenergized, there is a starting circuit completed which extends from ground upon grounded conductor 1160 by way of front contact and armature 1226, armature 1221 and its back contact, armature 1234 and its back contact, and relay 1204 to battery. The relay 1204 is energized to complete a circuit for the relay 1205 at armature 1232, and to complete a circuit, at armature 1233, that extends from ground by way of armature 1228 and its front contact, front contact and armature 1233, relay 1206, and front contact and armature 1237 to battery. The relay 1205 is not energized so long as the original circuit for the relay 1204 is maintained.

The relay 1206 is operated to open the circuits of the relays 1207 and 1208. The relay 1208 is deenergized to open the circuit of the relay 1204. The relay 1205 is immediately energized in series with the relay 1204. By the operation of the relay 1205, the holding circuit extending between the intermediate and distant stations is opened and the holding relays 1003 and 1202 at the intermediate and distant stations, respectively, are deenergized. The results of the deenergization of these relays are the same as those previously described and function to bring about the selecting operation of the relay apparatus. The purpose of this reoperation of the selective apparatus is to check the setting of the signal-repeating relays so that they will correspond to the position of the apparatus units at the distant station.

It will be remembered that, when the relay 814 is operated, as a result of the energization of the relay 813, a circuit is momentarily completed at armature 829 for the relay 805. The relay 805 is operated to complete a circuit that extends from ground by way of armature 1081 and its back contact, conductor 851, armature 830 and its front contact, slow-acting relay 806 and relay 805 to battery. The relay 806 is energized when the original energizing circuit of the relay 805 is opened. The relay 806 operates to prepare a starting circuit at armature 831 and to open another point in the circuit of the relay 805 at armature 832. The starting circuit above mentioned is not completed by reason of the fact that the relay 1003 is deenergized.

When the relay 1003 is operated over the holding circuit, the circuit of the relays 805 and 806 is opened at armature 1091 and, before the slow-acting relay 806 has become deenergized, a circuit is completed extending from ground by way of armature 1091 and its front contact, conductor 850, front contact and armature 831, conductor 663, front contact and armature 624, armature 619 and its back contact, armature 632 and its back contact, and relay 604 to battery.

The relay 605 is short-circuited so long as the relay 604 is energized. When the slow-acting relay 806 is deenergized, the original circuit for the relay 604 is opened and the relay 605 is energized in circuit with the relay 604. The relay 605 operates to open the holding circuit extending between the dispatcher's office and the intermediate station. This action causes the operation of the selective apparatus in the dispatcher's office and intermediate station to be initiated.

The selective action of the apparatus in the intermediate and distant stations will, of course, take place in the same manner as before described, following the deenergization of the holding relays. By the operation of this selective apparatus, the position of the signal-repeating relays is checked. By the operation of the selective apparatus in the dispatcher's office and intermediate station, the position of the various signal-repeating relays is checked. By reason of the fact that the selective apparatus in the dispatcher's office and intermediate station must select the apparatus units located at the distant station before checking the setting of the signal-repeating relays, the position of the signal-repeating relays will be checked by the operation of the selective apparatus in the intermediate and distant stations. Consequently, the signalling devices at the dispatcher's office will be operated to indicate the position of the apparatus units at both the intermediate and distant stations.

In the event that the selective apparatus in the dispatcher's office and intermediate station is operating when the above-described starting circuit is completed, the relay 607 will be the one that is energized, followed by the operation of the relay 608. The operation of the relay 608 prepares a new starting circuit which will be effective after the selective operation of the apparatus in the office and intermediate station has been completed. The operation of the selecting apparatus will be obvious if a circuit interrupter at either the intermediate or distant stations is operated automatically by the connection of devices responsive to circuit conditions, as the starting circuits function in substantially the same manner as above described.

My invention is not limited to the particular arrangement of the apparatus described, but may be variously modified without departing from the spirit and scope thereof, as set forth in the appended claims.

I claim as my invention:

1. In a signalling system, the combination with a first station and a plurality of other stations, a group of relays at said first station, a group of relays at each of the other stations, and a plurality of devices at each of said other stations selectively controlled by said relays, of means for operating the relays in said first station in a predetermined sequence, and for operating the relays at another of said stations in the same sequence, and means controlled by the operation of said relays in the two stations for bringing about the operation of the relays in the remaining stations in a predetermined sequence to select any one of said devices.

2. In a signalling system, the combination with a first, second and third station, of selecting apparatus in each of said stations each having a plurality of selecting positions, devices at said second station, devices at said third station, means for operating the selecting apparatus in the first and second stations to a predetermined selecting position, means operative during the operation to said predetermined position for successively selecting said devices at the second station, and means controlled by said selecting apparatus after reaching the predetermined position for operating the selecting apparatus in the third station to select said third-station devices successively.

3. In a signalling system, the combination with a first, second and third station, of selecting apparatus at each of said stations, devices at the second and third stations, indicating devices at said first station individual to each of said devices at the second and third stations, means for operating the devices at said second and third stations, means responsive to the operation of a device at the second or third station to initiate the operation of the selecting apparatus at said first, second and third stations, and means including said selecting apparatus for operating the indicating device at the first station individual to the operated device to indicate the operation thereof.

4. In a signalling system, the combination with a first, second and third station, of selecting apparatus at each of said stations, devices at said second and third stations, indicators at said first station individual to said devices, means for operating the devices at the second and third stations, means responsive to the operation of a device at either station to initiate the operation of the selecting apparatus at all of said stations, and means including the selecting apparatus at each station for effecting the operation of the indicator individual to the operated device.

5. In a signalling system, the combination with a first, second and third station, of selecting apparatus in each of said stations, devices at said third station, means for operating the selecting apparatus at the first and second stations to a predetermined selecting position, means responsive to such operation to initiate the operation of the selecting apparatus at the third station, and means for operating the selecting apparatus at the third station in accordance with the selecting positions of the selecting apparatus at said first and second stations to select said devices.

6. In a supervisory control system, a first station, a plurality of remote stations, a chain of relays at said first station and said remote stations, apparatus units at said remote stations, means including said chains of relays for selecting from said first station one of said apparatus units for operation, means for transmitting an operating impulse from said first station to operate said selected apparatus unit and means whereby said impulse is repeated from station to station until the selected unit is reached whereby said apparatus unit is operated.

7. In a supervisory control system, a first station, a second station, a third station, apparatus units at said second and third stations, a chain of relays at said first station, a chain of relays at said second station, means including said chains of relays for selectively operating said apparatus units at the second station from said first station, a second chain of relays at said second station, a chain of relays at said third station and means including said first, second and third chains of relays at each of said stations for selectively operating said apparatus units at said third station from said first station.

8. In a supervisory control system, a first station, a second station, a third station, apparatus units at said second and third stations, a chain of relays at said first station, a chain of relays at said second station, means including said chains of relays for selectively operating said apparatus units at the second station from said first station, a second chain of relays at said second station, a chain of relays at said third station, means including said first and said second station chains of relays for starting said second chain of relays at the said second station and said chain of relays at said third station into operation, means for operating said second chain of relays at said second station and said chain of relays at said third station synchronously, and means including said chains of relays for selectively operating said third station apparatus units from said first station.

9. In a supervisory control system, a first station, a second station, a third station, apparatus units at said second and third stations, operating means for each of said second station apparatus units, operating means individual to each of said third station apparatus units at said first and said second stations, a distributing mechanism at said first and said second stations, a distributing mechanism at said second and third stations, means including said distributing mechanism at said first and second stations and said operating means for the second station apparatus units for selectively operating said second station apparatus units from said first station, means including said first and second station distributing apparatus and said operating means at the first station individual to the third station apparatus units for selectively operating said second station operating means, means responsive to the operation of said second station operating means for starting said second and third station distributor apparatus into operation and means including said second and third station distributing mechanisms and said operated operating means at said second station for selectively operating said apparatus units at said third station.

In testimony whereof, I have hereunto subscribed my name this 23rd day of March, 1925.

THOMAS U. WHITE.